US012795551B2

(12) United States Patent
Rydén et al.

(10) Patent No.: US 12,795,551 B2
(45) Date of Patent: Nov. 10, 2026

(54) USER EQUIPMENT (UE) FEEDBACK FOR IMPROVED ENERGY EFFICIENCY CONFIGURATION

(71) Applicant: Telefonaktiebolaget LM Ericsson (publ), Stockholm (SE)

(72) Inventors: Henrik Rydén, Stockholm (SE); Luca Lunardi, Genoa (IT); Angelo Centonza, Granada (ES); Reem Karaki, Aachen (DE); Sina Maleki, Malmö (SE); Andres Reial, Höllviken (SE); Ali Nader, Malmö (SE); Pradeepa Ramachandra, Linköping (SE); Marco Belleschi, Solna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 164 days.

(21) Appl. No.: 18/555,022

(22) PCT Filed: Apr. 27, 2022

(86) PCT No.: PCT/EP2022/061125

§ 371 (c)(1),
(2) Date: Oct. 12, 2023

(87) PCT Pub. No.: WO2022/229233

PCT Pub. Date: Nov. 3, 2022

(65) Prior Publication Data

US 2024/0187991 A1 Jun. 6, 2024

Related U.S. Application Data

(60) Provisional application No. 63/182,057, filed on Apr. 30, 2021.

(51) Int. Cl.
*H04W 52/02* (2009.01)
*H04W 24/10* (2009.01)
*H04W 28/02* (2009.01)

(52) U.S. Cl.
CPC ....... *H04W 52/0258* (2013.01); *H04W 24/10* (2013.01); *H04W 28/0268* (2013.01)

(58) Field of Classification Search
None
See application file for complete search history.

(56) References Cited

U.S. PATENT DOCUMENTS

2011/0211466 A1* 9/2011 Kazmi .............. H04W 52/0261 370/252
2013/0215809 A1 8/2013 Chang et al.
(Continued)

FOREIGN PATENT DOCUMENTS

| | | | |
|---|---|---|---|
| EP | 2232722 | A1 | 9/2010 |
| EP | 3114889 | A1 | 1/2017 |
| WO | 2011075151 | A1 | 6/2011 |

OTHER PUBLICATIONS

"3GPP TR 38.814 V15.0.0", 3rd Generation Partnership Project; Technical Specification Group Radio Access Network; New frequency range for NR (4.4-5.0 GHZ) (Release 15), Jun. 2018, pp. 1-10.

(Continued)

*Primary Examiner* — Andre Tacdiran
(74) *Attorney, Agent, or Firm* — Murphy, Bilak & Homiller, PLLC

(57) ABSTRACT

Embodiments include methods for a user equipment (UE) configured to operate in a cell of a wireless network. Such methods include receiving, from a network node of the wireless network, one or more configurations for UE operation in the cell and determining one or more of the following information associated with at least the received configura-
(Continued)

tions and with UE data traffic: UE energy efficiency (EE), and quality-of-service (QoS). Such methods also include sending, to the network node, the determined information or one or more indications thereof. In some embodiments, such methods also include receiving, from the network node, a further configuration for UE operation in the cell. Other embodiments include complementary methods for a network node, as well as UEs and network nodes configured to perform such methods.

16 Claims, 9 Drawing Sheets

(56) References Cited

U.S. PATENT DOCUMENTS

| | | | | |
|---|---|---|---|---|
| 2020/0022017 | A1 | 1/2020 | Raghavan et al. | |
| 2020/0322869 | A1* | 10/2020 | Huang-Fu | H04W 76/22 |
| 2022/0086716 | A1* | 3/2022 | Byun | H04W 36/249 |
| 2022/0417799 | A1* | 12/2022 | Schnitzler | H04W 4/00 |

OTHER PUBLICATIONS

"3GPP TS 23.501 V16.8.0", 3rd Generation Partnership Project; Technical Specification Group Services and System Aspects; System architecture for the 5G System (5GS); Stage 2 (Release 16), Mar. 2021, pp. 1-451.

"3GPP TS 38.413 V16.5.0", 3rd Generation Partnership Project; Technical Specification Group Radio Access Network; NG-RAN; NG Application Protocol (NGAP) (Release 16), Apr. 2021, pp. 1-473.

"AL/ML for energy efficiency use case discussion", 3GPP TSG-RAN WG3 Meeting #112-e, R3-212315, Online meeting, May 17-27, 2021, pp. 1-10.

"Revised SID: Study on enhancement for data collection for NR and ENDC", 3GPP TSG RAN Meeting #89e, RP-201620, Electronic Meeting, Sep. 14-18, 2020, pp. 1-4.

"3GPP TS 38.401 V15.4.0", 3rd Generation Partnership Project; Technical Specification Group Radio Access Network; NG-RAN; Architecture description (Release 15), Dec 2018, pp. 1-40.

"3GPP TS 38.211 V16.5.0", 3rd Generation Partnership Project; Technical Specification Group Radio Access Network; NR; Physical channels and modulation (Release 16), Mar. 2021, pp. 1-134.

"3GPP TS 38.214 V15.0.0", 3rd Generation Partnership Project; Technical Specification Group Radio Access Network; NR; Physical layer procedures for data (Release 15), Dec. 2017, pp. 1-71.

"3GPP TS 38.214 V16.5.0", 3rd Generation Partnership Project; Technical Specification Group Radio Access Network; NR; Physical layer procedures for data (Release 16), Mar. 2021, pp. 1-171.

3GPP TS 36.413 V16.5.0, 3rd Generation Partnership Project; Technical Specification Group Radio Access Network; Evolved Universal Terrestrial Radio Access Network (E-UTRAN); S1 Application Protocol (S1AP) (Release 16), Apr. 2021, pp. 1-424.

* cited by examiner

USER EQUIPMENT (UE) FEEDBACK FOR IMPROVED ENERGY EFFICIENCY CONFIGURATION

TECHNICAL FIELD

The present disclose relates generally to wireless communication networks, and more specifically to techniques for reducing energy consumption of user equipment (UEs) based on UE feedback related to configurations for UE operation provided by a network.

BACKGROUND

Currently the fifth generation ("5G") of cellular systems, also referred to as New Radio (NR), is being standardized within the Third-Generation Partnership Project (3GPP). NR is developed for maximum flexibility to support multiple and substantially different use cases. These include enhanced mobile broadband (eMBB), machine type communications (MTC), ultra-reliable low latency communications (URLLC), side-link device-to-device (D2D), and several other use cases.

FIG. 1 illustrates an exemplary high-level view of the 5G network architecture, consisting of a Next Generation RAN (NG-RAN) 199 and a 5G Core (5GC) 198. NG-RAN 199 can include a set of gNodeB's (gNBs) connected to the 5GC via one or more NG interfaces, such as gNBs 100, 150 connected via interfaces 102, 152, respectively. In addition, the gNBs can be connected to each other via one or more Xn interfaces, such as Xn interface 140 between gNBs 100 and 150. On the NR interface to user equipment (UEs, e.g., wireless devices), each of the gNBs can support frequency division duplexing (FDD), time division duplexing (TDD), or a combination thereof.

NG-RAN 199 is layered into a Radio Network Layer (RNL) and a Transport Network Layer (TNL). The NG-RAN architecture, i.e., the NG-RAN logical nodes and interfaces between them, is defined as part of the RNL. For each NG-RAN interface (NG, Xn, F1) the related TNL protocol and the functionality are specified. The TNL provides services for user plane transport and signaling transport. In some exemplary configurations, each gNB is connected to all 5GC nodes within an "AMF Region," with the term "AMF" being described in more detail below.

The NG-RAN nodes shown in FIG. 1 include a central (or centralized) unit (CU or gNB-CU) and one or more distributed (or decentralized) units (DU or gNB-DU). For example, gNB 100 includes gNB-CU 110 and gNB-DUs 120 and 130. CUs (e.g., gNB-CU 110) are logical nodes that host higher-layer protocols and perform various gNB functions such controlling the operation of DUs. Each DU is a logical node that hosts lower-layer protocols and can include, depending on the functional split, various subsets of the gNB functions. As such, each of the CUs and DUs can include various circuitry needed to perform their respective functions, including processing circuitry, transceiver circuitry (e.g., for communication), and power supply circuitry. Moreover, the terms "central unit" and "centralized unit" are used interchangeably herein, as are the terms "distributed unit" and "decentralized unit."

A gNB-CU connects to gNB-DUs over respective F1 logical interfaces, such as interfaces 122 and 132 shown in FIG. 1. The gNB-CU and connected gNB-DUs are only visible to other gNBs and the 5GC as a gNB. In other words, the F1 interface is not visible beyond gNB-CU.

Energy consumption is a very important operational characteristics for UEs, to the extent that it affects and, in some cases, mandates UE and network configuration for UEs operating in certain network and traffic scenarios. For example, the network is expected to configure UEs to avoid excess UE energy consumption, extent UE battery life, and avoid UE overheating.

As a general principle, UE energy consumption can be reduced by 1) increasing the portion of operational time that the UE spend in sleep and/or low-energy states, especially deep sleep in which much of the UE's radio frequency (RF) circuitry is turned off, and/or 2) operating at minimum necessary receiver configuration when monitoring for signals transmitted by the network (e.g., minimum number of receive antennas, narrow receive bandwidth, minimum necessary receiving quality, etc.). The network can facilitate UE energy consumption reduction by adjusting various parameters in UE configurations signaled to the respective UEs.

As another general principle, UE configurations that provide favorable UE energy consumption can impose undesirable effects on network performance and/or other aspects of UE performance. For example, data latency may be increased, UE and cell throughput may be reduced, and/or network signaling overhead may be increased.

SUMMARY

To understand these tradeoffs, the network needs to understand actual UE energy efficiency (EE) benefits that accompany the undesirable effects of a UE configuration. Currently-used UE energy consumption models may give the network some qualitative understanding of UE EE benefits of a particular configuration. However, these models do not accurately reflect the actual UE energy consumption, which can vary widely across devices, manufacturers, chipsets, software, etc. Accordingly, better solutions are needed.

Embodiments of the present disclosure provide specific improvements to communication between UEs and network nodes in a wireless network, such as by providing, enabling, and/or facilitating solutions to overcome exemplary problems summarized above and described in more detail below.

Embodiments include methods (e.g., procedures) for a UE (e.g., wireless device, etc.) operating in a cell of a wireless network (e.g., E-UTRAN, NG-RAN).

These exemplary methods can include receiving, from a network node, one or more configurations for UE operation in the cell. These exemplary methods can also include determining one or more of the following information associated with at least the received configurations and UE data traffic: UE energy efficiency (EE), and quality-of-service (QoS). These exemplary methods can also include sending, to the network node, the determined information or one or more indications thereof. In some embodiments, these exemplary methods can also include receiving, from the network node, a further configuration for UE operation in the cell.

In some embodiments, each configuration includes settings or values for one or more of the following:

- discontinuous reception (DRX) while the UE is operating in a connected state with the wireless network;
- DRX while the UE is operating in a non-connected state with the wireless network;
- wake-up signals (WUS) while the UE is operating in a non-connected state with the wireless network;
- measurement or monitoring of beams and/or reference signals transmitted by the network node;
- carrier aggregation (CA);

- dual connectivity (DC);
- bandwidth parts (BWP);
- multi-input multi-output (MIMO) reception and/or transmission;
- physical downlink control channel (PDCCH) monitoring; and
- quality-of-service (QoS).

In some embodiments, determining the UE EE information associated with each of the received configurations can include the UE determining one of the following for one of the configurations being used by the UE for operating in the cell:

- an actual UE energy consumption based on operating current measurements during an observation period; or
- an estimated UE energy consumption based on durations spent by the UE in each of a plurality of operating states during the observation period, and on a model for UE energy consumption in each of the plurality of operating states.

In some embodiments, determining the UE EE information associated with each of the received configurations can include the UE determining an estimated UE energy consumption for a configuration not being used by the UE based on one or more of the following:

- a database storing energy consumption information for at least one of a manufacturer, a model number, and a chipset associated with the UE;
- actual UE energy consumption during previous operation in the configuration or in a configuration similar to the configuration; and
- estimated durations spent by the UE in each of a plurality of operating states and a model for UE energy consumption in each of the plurality of operating states.

In some of these embodiments, determining the UE EE information associated with each of the received configurations can also include the UE adjusting actual or estimated UE energy consumption by removing energy consumption that is independent of the one or more configurations.

In some embodiments, each of the configurations can include a QoS identifier associated with one or more QoS characteristics. In such case, the UE determines and sends UE EE information only for the configurations having a QoS identifier and/or QoS characteristics that correspond an established data radio bearer (DRB) for the UE and/or data traffic of one or more UE applications.

In some embodiments, the determined information or one or more indications thereof sent to the network node can include one or more of the following:

- respective absolute EE ratings for the received configurations;
- one absolute EE rating for a received configuration that is being used by the UE;
- respective EE ratings of the received configurations relative to a reference EE rating;
- respective EE differences between the received configurations and a configuration being used by the UE;
- an EE difference between two of the received configurations;
- actual or estimated absolute UE energy consumption for the received configurations; and
- actual or estimated UE energy consumption for the received configurations, relative to a reference UE energy consumption.

In some of these embodiments, each received configuration can include a corresponding reference EE rating, which can include an estimated range of absolute EE ratings for the corresponding configuration. In such embodiments, the indications sent to the network node comprise indications of whether actual EE ratings of the receive configurations are within the respective estimated ranges of absolute EE ratings.

In other of these embodiments, the reference UE energy consumption can be one of the following:

- actual UE energy consumption when operating in a non-connected state with the wireless network; or
- actual or estimated UE energy consumption when operating in a reference configuration.

In some embodiments, the determined information or one or more indications thereof sent to the network node can also include one or more of the following:

- respective absolute QoS ratings for the received configurations;
- one absolute QoS rating for a received configuration that is being used by the UE;
- respective QoS differences between the received configurations and a configuration being used by the UE; and
- a QoS difference between two of the received configurations.

In some of these embodiments, the absolute EE rating and the absolute QoS rating associated with the same received configuration are represented by a combined EE/QoS rating.

In some embodiments, determining the information (e.g., UE EE and/or QoS) is based on UE data traffic during a single observation period or during each of a plurality of non-overlapping measurement periods comprising the single observation period.

In some embodiments, the determined information or one or more indications thereof sent to the network node can include an indication of a UE-preferred configuration not included in the received configurations and one or more of the following:

- UE EE and/or QoS information associated with the UE-preferred configuration; and
- an indication of one or more criteria for selecting the UE-preferred configuration.

In some embodiments, the determined information or one or more indications thereof are sent to the network node responsive to one or more of the following:

- receiving the configurations;
- a change in the UE data traffic;
- UE activation or deactivation of applications;
- UE change between a connected state and a non-connected state with the wireless network;
- UE mobility operation;
- change in one or more of the following used by the UE: network slice, QoS flow, data radio bearer (DRB), signaling radio bearer (SRB), and quality of experience (QoE) measurement configuration;
- actual or estimated UE energy consumption for a configuration used by the UE is greater than a first threshold;
- QoS for a configuration used by the UE is less than a second threshold; and
- a network-configured periodic or semi-statistical schedule.

In some embodiments, the exemplary method can also include sending, to the network node, an indication of the UE's feedback capabilities for configurations provided by the network and/or dynamic information associated with the UE's current conditions.

Other embodiments include exemplary methods (e.g., procedures) for a network node (e.g., base station, eNB, gNB, ng-eNB, etc.) serving a cell in a wireless network (e.g., E-UTRAN, NG-RAN). In general, these exemplary methods can be complementary to the exemplary methods for a UE summarized above.

These exemplary methods can include sending, to a UE, one or more configurations for UE operation in the cell. These exemplary methods can also include receiving, from the UE, one or more of the following information associated with at least the configurations and with UE data traffic: UE energy efficiency (EE), and quality-of-service (QoS). These exemplary methods can also include determining a further configuration for UE operation in the cell based on the received information and based on one or more of the following additional information: configuration of the cell; statistics associated with operation of the cell; current traffic conditions in the cell; and capabilities, status, and/or configuration of at least the UE.

In various embodiments, the one or more configurations can include any of the same information, have any of the same characteristics, and/or be sent by any of the same mechanisms as those summarized above for UE-related embodiments.

In some embodiments, the configuration of the cell can include one or more of the following parameters: cell size, carrier frequency, bandwidth, multi-user multi-input multi-output (MU-MIMO) capabilities.

In some embodiments, the statistics associated with operation of the cell can be based on one or more of the following parameters: block error rate (BLER), modulation and coding scheme (MCS), power control outer loop adjustments, data throughput, signal to interference and noise (SINR), and traffic load.

In some embodiments, the current traffic conditions in the cell are represented by one or more of the following parameters: traffic load during a most recent duration, number of UEs in a connected state with the wireless network during the most recent duration, signal quality measured by UEs during the most recent duration, number of mobility operations by UEs during the most recent duration, and number and/or type of radio bearers currently established for UEs.

In some embodiments, the capabilities, status, and/or configuration of at least the UE include any of the following: UE antenna configuration, UE energy source, UE manufacturer and/or model, UE chipset manufacturer and/or model, UE software version, UE class, UE performance category, and UE support for one or more transmission modes used in the cell.

In various embodiments, the received information (i.e., from the UE) can include any of the same information, have any of the same characteristics, and/or be received by the same mechanism, as the information determined and sent by the UE, such as those summarized above for UE-related embodiments.

Similarly, in various embodiments, the further configuration determined and sent by the network node can include any of the same information and/or have any of the same characteristics as the further configuration received by the UE, such as those summarized above for UE-related embodiments.

In some embodiments, these exemplary method can also include sending the one or more configurations to one or more further UEs; and receiving, from the further UEs, one or more of the following further information associated with at least the configurations and with further UE data traffic: respective further UE EE, and respective further UE QoS.

In such embodiments, determining the further configuration for UE operation in the cell can include the network node applying a reinforcement learning (RL) algorithm to the received information, the received further information, and the additional information. In some of these embodiments, the further configuration can be for all UEs operating in the cell, all UEs served by a particular network slice, or all UEs associated with a particular QoS profile.

In some embodiments, the receiving the information from the UE is responsive to one or more of the following:

- sending the configurations to the UE;
- a change in the UE data traffic;
- UE activation or deactivation of applications;
- UE change between a connected state and a non-connected state with the wireless network;
- UE mobility operation;
- change in one or more of the following used by the UE: network slice, QoS flow, DRB, SRB, and QoE measurement configuration;
- actual or estimated UE energy consumption for a configuration used by the UE is greater than a first threshold;
- QoS for a configuration used by the UE is less than a second threshold; and
- a network-configured periodic or semi-statistical schedule.

In some embodiments, these exemplary methods can also include configuring one or more of the following for operation in the cell according to the determined further configuration: the UE, and one or more further UEs. In some embodiments, these exemplary methods can also include receiving, from the UE, one or more of the following information:

- an indication of the UE's feedback capabilities for configurations provided by the network; and
- dynamic information associated with the UE's current conditions.

In such case, the one or more configurations sent to the UE are based on the received information.

Other embodiments include UEs (e.g., wireless devices, IoT devices, etc. or components thereof) and network nodes (e.g., base stations, eNBs, gNBs, ng-eNBs, etc. or components thereof) configured to perform operations corresponding to any of the exemplary methods described herein. Other embodiments include non-transitory, computer-readable media storing program instructions that, when executed by processing circuitry, configure such UEs and network nodes to perform operations corresponding to any of the exemplary methods described herein.

These and other embodiments described herein enable a UE to provide feedback on actual UE energy consumption, EE, and/or QoS impact, for one or more configurations provided by a network node. As such, embodiments facilitate improved network discovery of configurations that can reduce UE energy consumption for a particular QoS requirement, for all UEs that share at least some common characteristics and/or conditions. (e.g., manufacturer, chipset, software, RF architecture, radio conditions, cell traffic conditions, etc.).

For example, by using machine learning (ML)-based techniques, the network can adapt to specific characteristics of UEs as well as to different feedback metrics provided by different UEs. Moreover, UEs are incentivized to provide accurate feedback metrics since doing so helps train the ML-model used to generate improved configurations for all UEs with the shared characteristic(s) and/or condition(s). At a high level, embodiments facilitate improved management of UE energy consumption by a network.

These and other objects, features, and advantages of embodiments of the present disclosure will become apparent upon reading the following Detailed Description in view of the Drawings briefly described below.

DETAILED DESCRIPTION

Figure 1:
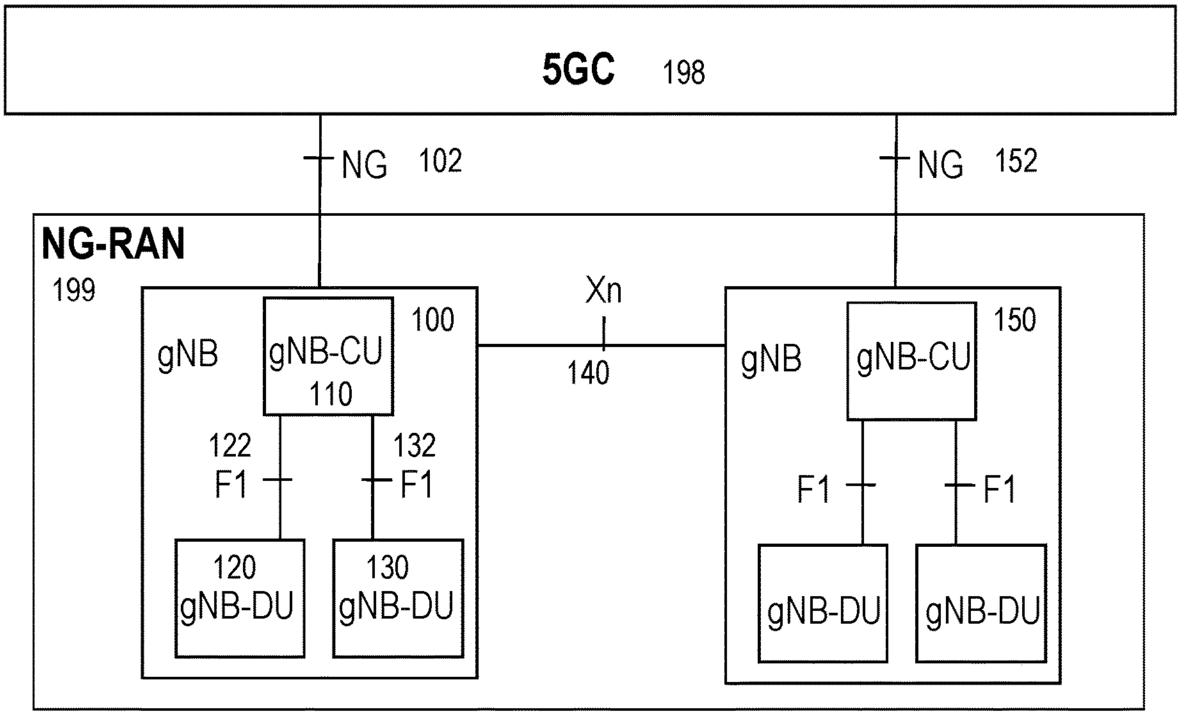
FIGS. 1-2 illustrate two high-level views of an exemplary 5G/NR network architecture.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided as examples to convey the scope of the subject matter to those skilled in the art.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods and/or procedures disclosed herein do not have to be performed in the exact order disclosed, unless a step is explicitly described as following or preceding another step and/or where it is implicit that a step must follow or precede another step. Any feature of any of the embodiments disclosed herein can be applied to any other embodiment, wherever appropriate. Likewise, any advantage of any of the embodiments can apply to any other embodiments, and vice versa. Other objects, features, and advantages of the enclosed embodiments will be apparent from the following description.

Furthermore, the following terms are used throughout the description given below:

- Radio Node: As used herein, a “radio node” can be either a “radio access node” or a “wireless device.”
- Radio Access Node: As used herein, a “radio access node” (or equivalently “radio network node,” “radio access network node,” or “RAN node”) can be any node in a radio access network (RAN) of a cellular communications network that operates to wirelessly transmit and/or receive signals. Some examples of a radio access node include, but are not limited to, a base station (e.g., a New Radio (NR) base station (gNB) in a 3GPP Fifth Generation (5G) NR network or an enhanced or evolved Node B (eNB) in a 3GPP LTE network), base station distributed components (e.g., CU and DU), a high-power or macro base station, a low-power base station (e.g., micro, pico, femto, or home base station, or the like), an integrated access backhaul (IAB) node, a transmission point (TP), a transmission reception point (TRP), a remote radio unit (RRU or RRH), and a relay node.
- Core Network Node: As used herein, a “core network node” is any type of node in a core network. Some examples of a core network node include, e.g., a Mobility Management Entity (MME), a serving gateway (SGW), a PDN Gateway (P-GW), a Policy and Charging Rules Function (PCRF), an access and mobility management function (AMF), a session management function (SMF), a user plane function (UPF), a Charging Function (CHF), a Policy Control Function (PCF), an Authentication Server Function (AUSF), a location management function (LMF), or the like.
- Wireless Device: As used herein, a “wireless device” (or “WD” for short) is any type of device that has access to (i.e., is served by) a cellular communications network by communicate wirelessly with network nodes and/or other wireless devices. Communicating wirelessly can involve transmitting and/or receiving wireless signals using electromagnetic waves, radio waves, infrared waves, and/or other types of signals suitable for conveying information through air. Unless otherwise noted, the term “wireless device” is used interchangeably herein with “user equipment” (or “UE” for short). Some examples of a wireless device include, but are not limited to, smart phones, mobile phones, cell phones, voice over IP (VoIP) phones, wireless local loop phones, desktop computers, personal digital assistants (PDAs), wireless cameras, gaming consoles or devices, music storage devices, playback appliances, wearable devices, wireless endpoints, mobile stations, tablets, laptops, laptop-embedded equipment (LEE), laptop-mounted equipment (LME), smart devices, wireless customer-premise equipment (CPE), mobile-type communication (MTC) devices, Internet-of-Things (IoT) devices, vehicle-mounted wireless terminal devices, etc.
- Network Node: As used herein, a “network node” is any node that is either part of the radio access network (e.g., a radio access node or equivalent name discussed above) or of the core network (e.g., a core network node discussed above) of a cellular communications network. Functionally, a network node is equipment capable, configured, arranged, and/or operable to communicate directly or indirectly with a wireless device and/or with other network nodes or equipment in the cellular communications network, to enable and/or provide wireless access to the wireless device, and/or to perform other functions (e.g., administration) in the cellular communications network.

Base station: As used herein, a "base station" may comprise a physical or a logical node transmitting or controlling the transmission of radio signals, e.g., eNB, gNB, ng-eNB, en-gNB, centralized unit (CU)/distributed unit (DU), transmitting radio access node, transmission point (TP), transmission reception point (TRP), remote radio head (RRH), remote radio unit (RRU), Distributed Antenna System (DAS), relay, etc.

In the following description, the term "message" is used generically to refer to any type of structured information carrier used by a first entity to send information to a second entity. Specific examples include messages or information elements (IEs) defined (or to be defined) in 3GPP specifications for existing or newly-defined interfaces, architectures, and/or protocol layers (e.g., RRC, MAC, Xn, F1AP, etc.).

Additionally, "message" may be used together with a numerical modifier, e.g., "first message, "second message", etc. The numerical modifiers do not imply a strict temporal ordering of such messages, unless explicitly stated otherwise. Rather, they are intended to distinguish between different messages having different content.

Furthermore, a first entity receiving a message "from" a second entity does not foreclose the possibility that the message travels on a path through one or more intermediate entities. Likewise, a first entity transmitting a message "to" a second entity does not foreclose the possibility that the message travels on a path through one or more intermediate entities.

The above definitions are not meant to be exclusive. In other words, various ones of the above terms may be explained and/or described elsewhere in the present disclosure using the same or similar terminology. Nevertheless, to the extent that such other explanations and/or descriptions conflict with the above definitions, the above definitions should control.

Note that the description given herein focuses on a 3GPP cellular communications system and, as such, 3GPP terminology or terminology similar to 3GPP terminology is oftentimes used. However, the concepts disclosed herein are not limited to a 3GPP system. Furthermore, although the term "cell" is used herein, it should be understood that (particularly with respect to 5G NR) beams may be used instead of cells and, as such, concepts described herein apply equally to both cells and beams.

As briefly mentioned above, currently-used UE energy consumption models may give the network some qualitative understanding of UE energy efficiency (EE) benefits of a particular configuration. However, these models do not accurately reflect the actual UE energy consumption, which can vary widely across devices, manufacturers, chipsets, software, etc. This is discussed in more detail below after the following discussion of the NR architecture, protocols, and physical layer.

Figure 2:
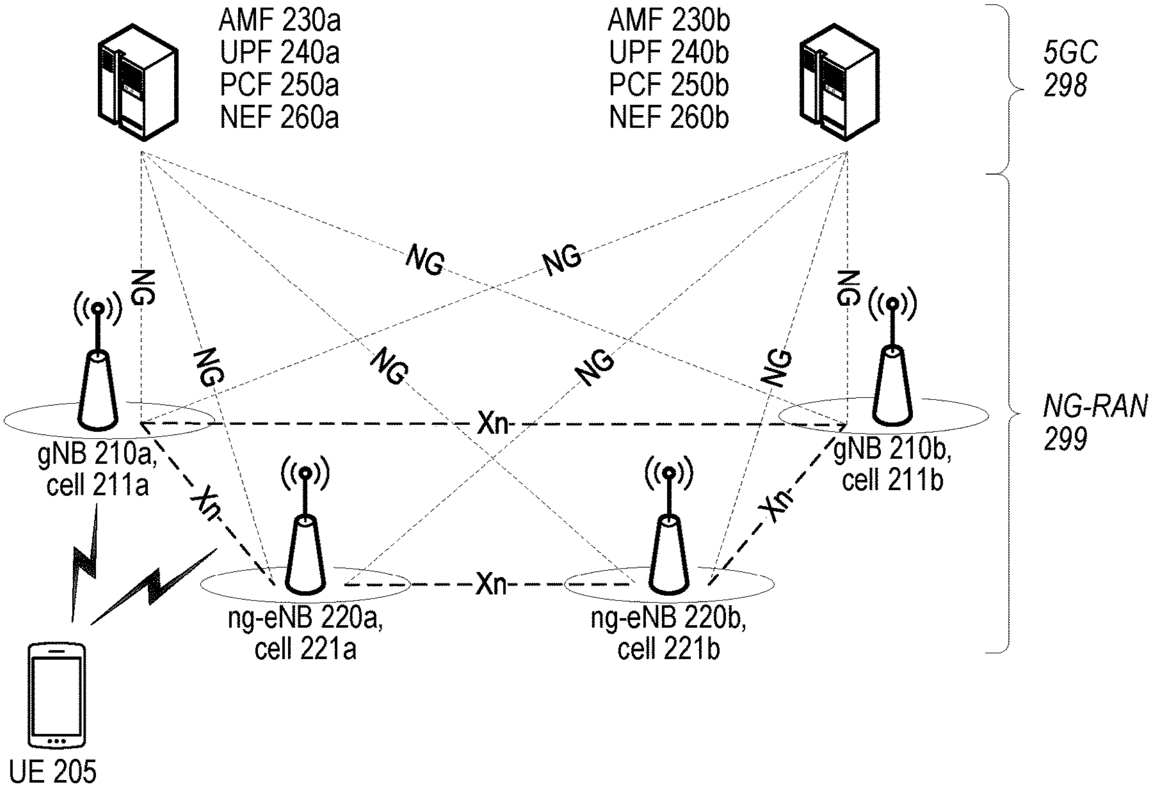

FIG. 2 shows a high-level view of another exemplary 5G network architecture, including NG-RAN 299 and 5GC 298. As shown in the figure, NG-RAN 299 can include gNBs (e.g., 210*a,b*) and ng-eNBs (e.g., 220*a,b*) that are interconnected with each other via respective Xn interfaces. The gNBs and ng-eNBs are also connected via the NG interfaces to 5GC 298, more specifically to the access and mobility management functions (AMFs, e.g., 230*a,b*) via respective NG-C interfaces and to the user plane functions (UPFs, e.g., 240*a,b*) via respective NG-U interfaces. Moreover, the AMFs can communicate with one or more policy control functions (PCFs, e.g., 250*a,b*) and network exposure functions (NEFs, e.g., 260*a,b*).

Each of the gNBs 210 can support the NR radio interface including frequency division duplexing (FDD), time division duplexing (TDD), or a combination thereof. Each of ng-eNBs 220 can support the fourth-generation (4G) Long-Term Evolution (LTE) radio interface. Unlike conventional LTE eNBs, however, ng-eNBs 220 connect to the 5GC via the NG interface. Each of the gNBs and ng-eNBs can serve a geographic coverage area including one more cells, such as cells 211*a-b* and 221*a-b* shown in FIG. 2. Depending on the cell in which it is located, a UE 205 can communicate with the gNB or ng-eNB serving that cell via the NR or LTE radio interface, respectively. Although FIG. 2 shows gNBs and ng-eNBs separately, it is possible that a single NG-RAN node provides both types of functionality.

5G/NR technology shares many similarities with LTE. For example, NR uses CP-OFDM (Cyclic Prefix Orthogonal Frequency Division Multiplexing) in the DL and both CP-OFDM and DFT-spread OFDM (DFT-S-OFDM) in the UL. As another example, in the time domain, NR DL and UL physical resources are organized into equal-sized 1-ms subframes. A subframe is further divided into multiple slots of equal duration, with each slot including multiple OFDM-based symbols. However, time-frequency resources can be configured much more flexibly for an NR cell than for an LTE cell. For example, rather than LTE's fixed 15-kHz OFDM sub-carrier spacing (SCS), NR SCS can be 15-240 kHz, with even greater SCS considered for future NR releases.

In addition to providing coverage via cells as in LTE, NR networks also provide coverage via "beams." In general, a downlink (DL, i.e., network to UE) "beam" is a coverage area of a network-transmitted reference signal (RS) that may be measured or monitored by a UE. In NR, for example, RS can include any of the following: synchronization signal/PBCH block (SSB), channel state information RS (CSI-RS), tertiary reference signals (or any other sync signal), positioning RS (PRS), demodulation RS (DMRS), phase-tracking reference signals (PTRS), etc. In general, SSB is available to all UEs regardless of the state of their connection with the network, while other RS (e.g., CSI-RS, DM-RS, PTRS) are associated with specific UEs that have a network connection.

Figure 3:
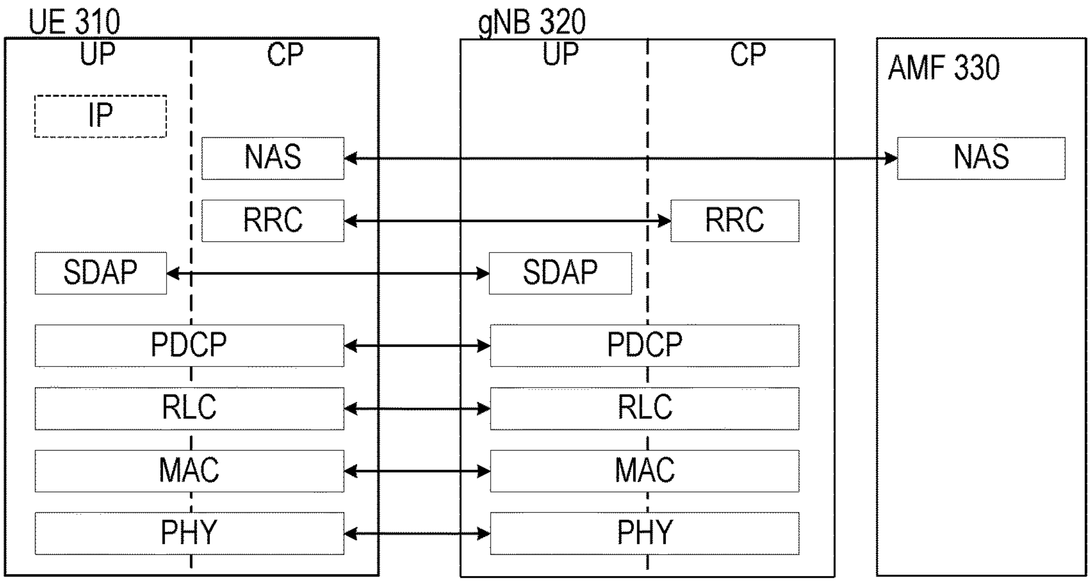
FIG. 3 shows an exemplary configuration of NR user plane (UP) and control plane (CP) protocol stacks.

FIG. 3 shows an exemplary configuration of NR user plane (UP) and control plane (CP) protocol stacks between a UE (310), a gNB (320), and an AMF (330), such as those shown in FIGS. 1-2. The Physical (PHY), Medium Access Control (MAC), Radio Link Control (RLC), and Packet Data Convergence Protocol (PDCP) layers between the UE and the gNB are common to UP and CP. The PDCP layer provides ciphering/deciphering, integrity protection, sequence numbering, reordering, and duplicate detection for both CP and UP. In addition, PDCP provides header compression and retransmission for UP data.

On the UP side, Internet protocol (IP) packets arrive to the PDCP layer as service data units (SDUs), and PDCP creates protocol data units (PDUs) to deliver to RLC. The Service Data Adaptation Protocol (SDAP) layer handles quality-of-service (QoS) including mapping between QoS flows and Data Radio Bearers (DRBs) and marking QoS flow identifiers (QFI) in UL and DL packets. The RLC layer transfers PDCP PDUs to the MAC through logical channels (LCH). RLC provides error detection/correction, concatenation, segmentation/reassembly, sequence numbering, reordering of data transferred to/from the upper layers. The MAC layer provides mapping between LCHs and PHY transport channels, LCH prioritization, multiplexing into or demultiplexing from transport blocks (TBs), hybrid ARQ (HARQ) error correction, and dynamic scheduling (on gNB side). The PHY layer provides transport channel services to the MAC layer and handles transfer over the NR radio interface, e.g., via modulation, coding, antenna mapping, and beam forming.

On CP side, the non-access stratum (NAS) layer is between UE and AMF and handles UE/gNB authentication, mobility management, and security control. The RRC layer sits below NAS in the UE but terminates in the gNB rather than the AMF. RRC controls communications between UE and gNB at the radio interface as well as the mobility of a UE between cells in the NG-RAN. RRC also broadcasts system information (SI) and performs establishment, configuration, maintenance, and release of DRBs and Signaling Radio Bearers (SRBs) and used by UEs. RRC also controls addition, modification, and release of carrier aggregation (CA) and dual-connectivity (DC) configurations for UEs. RRC also performs various security functions such as key management.

After a UE is powered ON it will be in the RRC_IDLE state until an RRC connection is established with the network, at which time the UE will transition to RRC_CONNECTED state (e.g., where data transfer can occur). The UE returns to RRC_IDLE after the connection with the network is released. In RRC_IDLE state, the UE's radio is active on a discontinuous reception (DRX) schedule configured by upper layers. During DRX active periods (also referred to as "DRX On durations"), an RRC_IDLE UE receives SI broadcast in the cell where the UE is camping, performs measurements of neighbor cells to support cell reselection, and monitors a paging channel on PDCCH for pages from 5GC via gNB. An NR UE in RRC_IDLE state is not known to the gNB serving the cell where the UE is camping. However, NR RRC includes an RRC_INACTIVE state in which a UE is known (e.g., via UE context) by the serving gNB. RRC_INACTIVE has some properties similar to a "suspended" condition used in LTE.

As used herein, the term "connected state" encompasses RRC_CONNECTED and similar UE operational states with and/or towards a wireless network (e.g., E-UTRAN, NG-RAN, etc.). Likewise, the term "non-connected state" encompasses RRC_IDLE, RRC_INACTIVE, and similar UE operational states with and/or towards a wireless network (e.g., E-UTRAN, NG-RAN, etc.).

Support for bandwidths larger than 20 MHz was introduced in LTE Rel-10 supports, with backward compatibility with LTE Rel-8. As such, an LTE Rel-10 carrier wider than 20 MHz should appear as a number of component carriers (CCs) to an LTE Rel-8 ("legacy") terminal. This technique is generally referred to as Carrier Aggregation (CA). A dual connectivity (DC) framework was introduced in LTE Rel-12. DC refers to a mode of operation in which a UE, in RRC_CONNECTED state, consumes radio resources provided by at least two different network nodes (or points) connected to one another with a non-ideal backhaul. In LTE, these two network nodes are referred to as master eNB (MeNB) and secondary eNB (SeNB) but can be referred to more generally as master node (MN) and secondary node (SN), respectively. NR also includes new DC variants, including multi-RAT (MR) DC involving one connection to a NR node (e.g., gNB) and a second connection to an eNB.

In DC, a UE is configured with a Master Cell Group (MCG) associated with the MN and a Secondary Cell Group (SCG) associated with the SN. Each of the CGs is a group of serving cells that includes one MAC entity, a set of logical channels with associated RLC entities, a primary cell (PCell), and optionally one or more secondary cells (SCells). The term "Special Cell" (or "SpCell" for short) refers to the PCell of the MCG or the PCell of the SCG (also referred to as "primary SCG cell" or "PSCell") depending on whether the UE's MAC entity is associated with the MCG or the SCG, respectively. In non-DC operation (e.g., CA), SpCell refers to the PCell. An SpCell is always activated and supports PUCCH transmission and contention-based random access by UEs.

Figure 4:
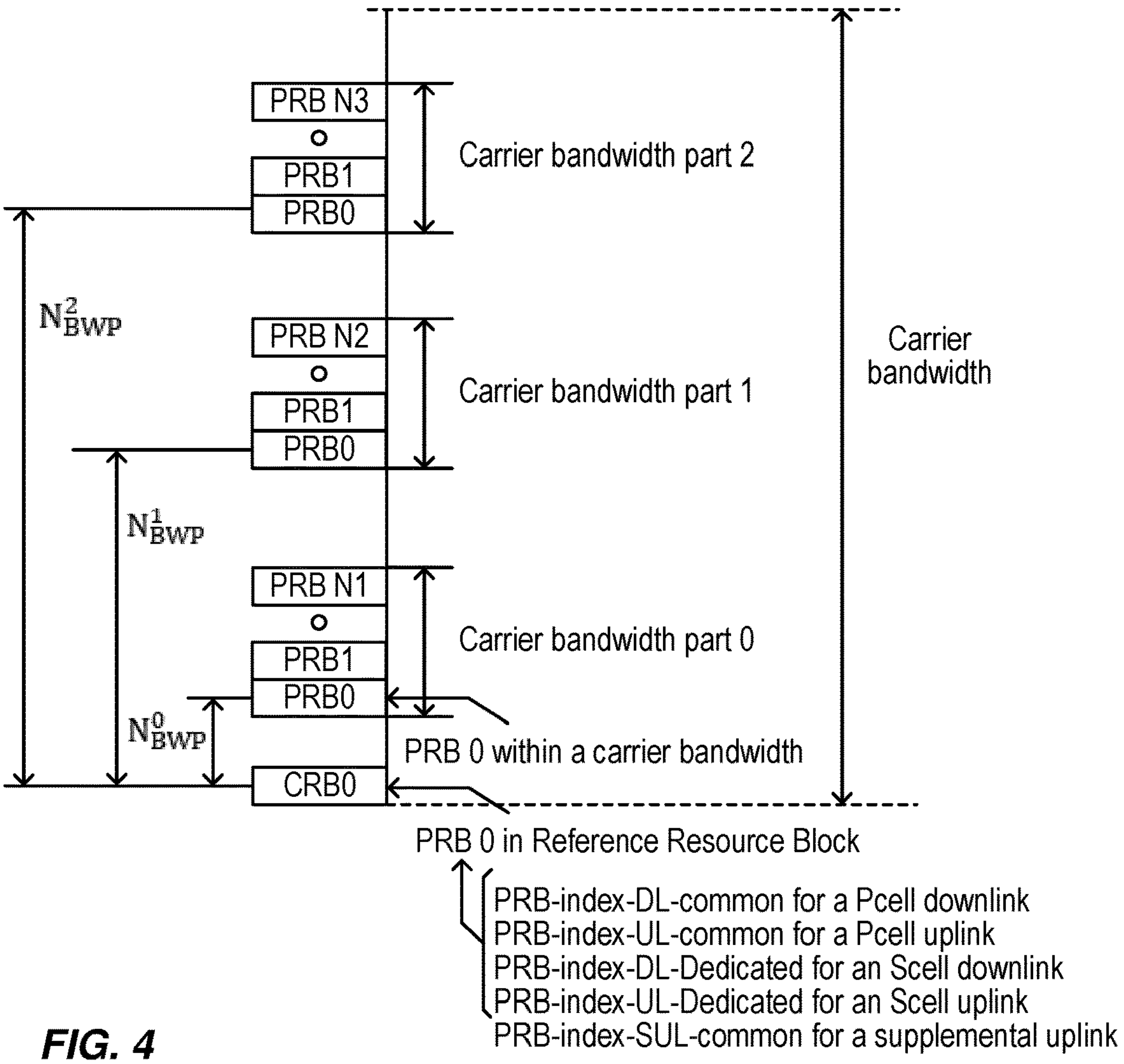
FIG. 4 shows an exemplary frequency-domain configuration for an NR UE.

FIG. 4 shows an exemplary frequency-domain configuration for an NR UE. In Rel-15 NR, a UE can be configured with up to four carrier bandwidth parts (BWPs) in a DL carrier bandwidth with a single DL BWP being active at a given time. A UE can be configured with up to four BWPs in an UL carrier bandwidth with a single UL BWP being active at a given time. If a UE is configured with a supplementary UL, the UE can be configured with up to four additional BWPs in the supplementary UL carrier bandwidth, with a single supplementary UL BWP being active at a given time.

Common RBs (CRBs) are numbered from 0 to the end of the carrier bandwidth. Each BWP configured for a UE has a common reference of CRB0, such that a configured BWP may start at a CRB greater than zero. CRB0 can be identified by one of the following parameters provided by the network, as further defined in 3GPP TS 38.211 (v16.5.0) section 4.4:

PRB-index-DL-common for DL in a primary cell (PCell, e.g., PCell or PSCell);

PRB-index-UL-common for UL in a PCell;

PRB-index-DL-Dedicated for DL in a secondary cell (SCell);

PRB-index-UL-Dedicated for UL in an SCell; and

PRB-index-SUL-common for a supplementary UL.

In this manner, a UE can be configured with a narrow BWP (e.g., 10 MHz) and a wide BWP (e.g., 100 MHz), each starting at a particular CRB, but only one BWP can be active for the UE at a given point in time. Within a BWP, PRBs are defined and numbered in the frequency domain from 0 to $$N_{BWP,i}^{size}-1,$$

where i is the index of the particular BWP for the carrier. For example, as shown in FIG. 3, BWP0 includes PRBs 0 to N1, BWP1 includes PRBs 0 to N2, and BWP2 includes PRBs 0 to N3.

NR supports various SCS values $\Delta f=(15\times 2^{\mu})$ kHz, where $\mu\in(0, 1, 2, 3, 4)$ are referred to as "numerologies." Numerology $\mu=0$ (i.e., $\Delta f=15$ kHz) provides the basic (or reference) SCS that is also used in LTE. The symbol duration, cyclic prefix (CP) duration, and slot duration are inversely related to SCS or numerology. For example, there is one (1-ms) slot per subframe for $\Delta f=15$ kHz, two 0.5-ms slots per subframe for $\Delta f=30$ kHz, etc. In addition, the maximum carrier bandwidth is directly related to numerology according to $2^{\mu}\cdot 50$ MHz. Table 1 below summarizes currently-supported NR numerologies and associated parameters. Different DL and UL numerologies can be configured by the network.

TABLE 1

| μ | Δf = $2^{\mu}$ · 15 (kHz) | Cyclic prefix (CP) | CP duration | Symbol duration | Symbol + CP | Slot duration | Max carrier BW |
|---|---|---|---|---|---|---|---|
| 0 | 15 | Normal | 4.69 μs | 66.67 μs | 71.35 μs | 1 ms | 50 MHz |
| 1 | 30 | Normal | 2.34 μs | 33.33 μs | 35.68 μs | 0.5 ms | 100 MHz |
| 2 | 60 | Normal, Extended | 1.17 μs | 16.67 μs | 17.84 μs | 0.25 ms | 200 MHz |
| 3 | 120 | Normal | 0.59 μs | 8.33 μs | 8.92 μs | 125 μs | 400 MHz |
| 4 | 240 | Normal | 0.29 μs | 4.17 μs | 4.46 μs | 62.5 μs | 800 MHz |

Figure 5:
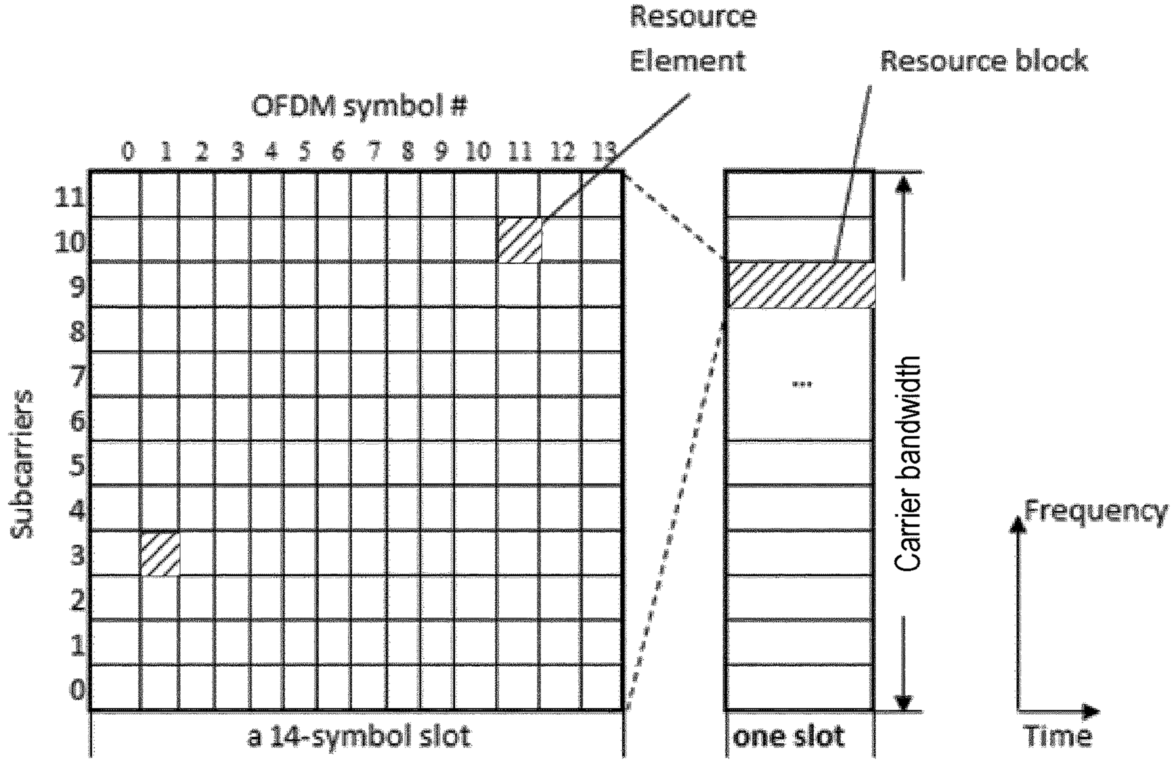
FIGS. 5-6 show exemplary NR slot structures.

FIG. 5 shows an exemplary time-frequency resource grid for an NR slot. As illustrated in FIG. 5, a resource block (RB) consists of a group of 12 contiguous OFDM subcarriers for a duration of a 14-symbol slot. Like in LTE, a resource element (RE) consists of one subcarrier in one slot. An NR slot can include 14 OFDM symbols for normal cyclic prefix (e.g., as shown in FIG. 3) and 12 symbols for extended cyclic prefix.

NR also supports Type-B scheduling, also known as "mini-slots." These are shorter than slots, typically ranging from one symbol to one less than the number of symbols in a slot (e.g., 13 or 11), and can start at any symbol of a slot. Mini-slots can be used if transmission duration of a slot is too long and/or the occurrence of the next slot start (slot alignment) is too late. Applications of mini-slots include unlicensed spectrum and latency-critical transmission (e.g., URLLC). However, mini-slots are not service-specific and can also be used for eMBB or other services.

Figure 6:
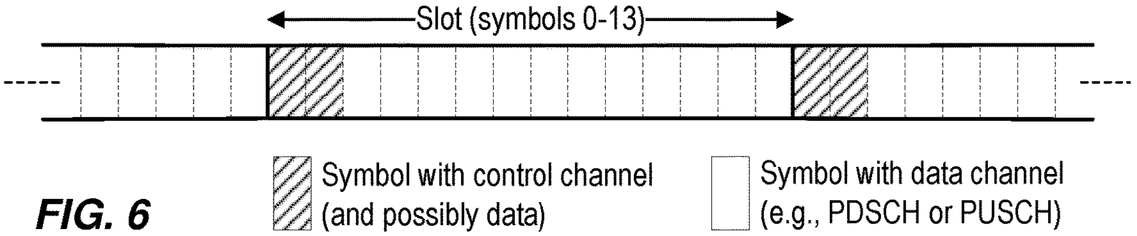

FIG. 6 shows an exemplary NR slot structure comprising 14 symbols. In this arrangement, PDCCH is confined to a region containing a particular number of symbols and a particular number of subcarriers, referred to as the control resource set (CORESET). In the exemplary structure shown in FIG. 6, the first two symbols contain PDCCH and each of the remaining 12 symbols contains physical data channels (PDCH), i.e., either PDSCH or PUSCH. Depending on the particular CORESET configuration (discussed below), however, the first two slots can also carry PDSCH or other information, as required.

The smallest unit used for defining CORESET is the REG, which spans one PRB in frequency and one OFDM symbol in time. In addition to PDCCH, each REG contains demodulation reference signals (DM-RS) to aid in the estimation of the radio channel over which that REG is transmitted. An NR control channel element (CCE) consists of six REGs. These REGs may either be contiguous or distributed in frequency. When the REGs are distributed in frequency, the CORESET is said to use interleaved mapping of REGs to a CCE, while if the REGs are contiguous in frequency, a non-interleaved mapping is said to be used. Interleaving can provide frequency diversity. Not using interleaving is beneficial for cases where knowledge of the channel allows the use of a precoder in a particular part of the spectrum improve the SINR at the receiver.

Similar to LTE, NR data scheduling can be performed dynamically, e.g., on a per-slot basis. In each slot, the base station (e.g., gNB) transmits downlink control information (DCI) over PDCCH that indicates which UE is scheduled to receive data in that slot, as well as which RBs will carry that data. A UE first detects and decodes DCI and, if the DCI includes DL scheduling information for the UE, receives the corresponding PDSCH based on the DL scheduling information. DCI formats 1_0 and 1_1 are used to convey PDSCH scheduling.

Likewise, DCI on PDCCH can include UL grants that indicate which UE is scheduled to transmit data on PUCCH in that slot, as well as which RBs will carry that data. A UE first detects and decodes DCI and, if the DCI includes an uplink grant for the UE, transmits the corresponding PUSCH on the resources indicated by the UL grant. DCI formats 0_0 and 0_1 are used to convey UL grants for PUSCH, while Other DCI formats (2_0, 2_1, 2_2 and 2_3) are used for other purposes including transmission of slot format information, reserved resource, transmit power control information, etc.

In NR Rel-15, the DCI formats 0_0/1_0 are referred to as "fallback DCI formats," while the DCI formats 0_1/1_1 are referred to as "non-fallback DCI formats." The fallback DCI support resource allocation type 1 in which DCI size depends on the size of active BWP. As such DCI formats 0_1/1_1 are intended for scheduling a single TB transmission with limited flexibility. On the other hand, the non-fallback DCI formats can provide flexible TB scheduling with multi-layer transmission.

A DCI includes a payload complemented with a Cyclic Redundancy Check (CRC) of the payload data. Since DCI is sent on PDCCH that is received by multiple UEs, an identifier of the targeted UE needs to be included. In NR, this is done by scrambling the CRC with a Radio Network Temporary Identifier (RNTI) assigned to the UE. Most commonly, the cell RNTI (C-RNTI) assigned to the targeted UE by the serving cell is used for this purpose.

DCI payload together with an identifier-scrambled CRC is encoded and transmitted on the PDCCH. Given previously configured search spaces, each UE tries to detect a PDCCH addressed to it according to multiple hypotheses (also referred to as "candidates") in a process known as "blind decoding." PDCCH candidates span 1, 2, 4, 8, or 16 CCEs, with the number of CCEs referred to as the aggregation level (AL) of the PDCCH candidate. If more than one CCE is used, the information in the first CCE is repeated in the other CCEs, which increases robustness for a given payload size. In other words, PDCCH link adaptation can be performed by adjusting AL. Depending on AL, PDCCH candidates can be located at various time-frequency locations in the CORESET.

Once a UE decodes a DCI, it de-scrambles the CRC with RNTI(s) that is (are) assigned to it and/or associated with the particular PDCCH search space. In case of a match, the UE considers the detected DCI as being addressed to it, and follows the instructions (e.g., scheduling information) in the DCI.

For example, to determine the modulation order, target code rate, and TB size(s) for a scheduled PDSCH transmission, the UE first reads the 5-bit modulation and coding scheme field ($I_{MCS}$) in the DCI (e.g., formats 1_0 or 1_1) to determine the modulation order ($Q_m$) and target code rate (R) based on the procedure defined in 3GPP TS 38.214 (v16.5.0) section 5.1.3.1. Subsequently, the UE reads the redundancy version field (rv) in the DCI to determine the redundancy version. Based on this information together with the number of layers (υ) and the total number of allocated PRBs before rate matching ($n_{PRB}$), the UE determines the Transport Block Size (TBS) for the PDSCH according to the procedure defined in 3GPP TS 38.214 (v16.5.0) section 5.1.3.2.

DCI can also include information about various timing offsets (e.g., in slots or subframes) between PDCCH and PDSCH, PUSCH, HARQ, and/or CSI-RS. For example, offset K0 represents the number of slots between the UE's PDCCH reception of a PDSCH scheduling DCI (e.g., formats 1_0 or 1_1) and the subsequent PDSCH transmission. Likewise, offset K1 represents the number of slots between this PDSCH transmission and the UE's responsive HARQ ACK/NACK transmission on the PUSCH. In addition, offset K3 represents the number of slots between this responsive ACK/NACK and the corresponding retransmission of data on PDSCH. In addition, offset K2 represents the number of slots between the UE's PDCCH reception of a PUSCH grant DCI (e.g., formats 0_0 or 0_1) and the subsequent PUSCH transmission. Each of these offsets can take on values of zero and positive integers.

K0 is part of a PDSCH time-domain resource allocation (TDRA). Also included in the PDSCH TDRA is a slot length indicator value (SLIV) that identifies a particular combination of a starting symbol (S) and a length (L) of the resource allocation. In general, S can be any symbol 0-13 and L can be any number of symbols beginning with S until the end of the slot (i.e., symbol 13). The SLIV can be used as an index to a table of (S, L) combinations. Similarly, K2 is part of a PUSCH TDRA that also includes a corresponding SLIV.

Depending on DRX configuration, a UE may spend a substantial part of its energy on decoding PDCCH without detecting a DL scheduling assignment or UL resource grant directed to it. Techniques to reduce unnecessary PDCCH monitoring, allow a UE to go to sleep more often and/or for longer periods, or allow a UE to wake up less frequently and/or for shorter periods can be beneficial. One such technique introduced in LTE Rel-15 for LTE-M and NB-IoT is a Wake-up Signal (WUS) that can be detected by the UE using much less energy relative to MPDCCH/NPDCCH detection (referred to generically as "PDCCH detection"). When a UE detects a WUS intended for it, the UE will wake up and activate a conventional PDCCH decoder.

The decoding time for a WUS is considerably shorter than that of the full (M/N)PDCCH because WUS only needs to contain one bit of information. In comparison, NPDCCH may contain up to 35 bits of information. This reduced decoding results in reduced UE energy consumption and longer UE battery life. The sleep time between actual WUS also improves these aspects of UE performance. Put differently, for the same channel and same missed detection rate, it is possible to transmit a shorter WUS compared to PDCCH since the WUS carries less information. The shorter WUS requires the UE's receiver to be turned on for less time and facilitates faster UE baseband processing, both of which reduce UE energy consumption. In some cases, a UE may include a dedicated, low-complexity receiver for the WUS. The primary receiver will only be turned on (e.g., to decode PDCCH) based on an indication that the dedicated receiver has detected a WUS. This arrangement can facilitate the UE remaining in deep sleep state for long durations with very low energy consumption.

Energy consumption is a very important operational characteristics for UEs, to the extent that it affects and, in some cases, mandates UE and network configuration for UEs operating in certain network and traffic scenarios. For example, the network is expected to configure UEs to avoid excess UE energy consumption, extent UE battery life, and avoid UE overheating.

As a general principle, UE energy consumption can be reduced by 1) increasing the portion of operational time that the UE spend in sleep and/or low-energy states, especially deep sleep in which much of the UE's radio frequency (RF) circuitry is turned off, and/or 2) operating at minimum necessary receiver configuration when monitoring for signals transmitted by the network (e.g., minimum number of receive antennas, narrow receive bandwidth, minimum necessary receiving quality, etc.). The network can facilitate these UE energy consumption reductions by adjusting various parameters in UE configurations signaled by the network to the respective UEs. Network configurations for reducing UE energy consumption can include any of the following:

- UE DRX configurations that allow short monitoring intervals and long sleep intervals between them. This can include DRX for paging monitoring in RRC_IDLE and RRC_INACTIVE states (e.g., period, paging opportunity (PO) length, number of POs, etc.) as well as connected DRX (cRDX) for data scheduling in RRC_CONNECTED state (e.g., period, onDuration length, etc.)
- Minimizing inactivity timers, including cRDX inactivity timer from last data scheduling to returning to cRDX and/or data inactivity time from last data scheduling to returning to RRC_IDLE state.
- Enabling mechanisms that pre-signal whether monitoring is necessary in upcoming intervals, including the WUS discussed above to indicate status of next onDuration in RRC_CONNECTED state as well as PEI to indicate status of next PO in RRC_IDLE state.
- Guarantee sufficient time for UE receiver reconfiguration from a minimal to a performance-optimized mode, including cross-slot scheduling with a minimum PDCCH/PDSCH separation (i.e., K0), PDCCH skipping durations, PDCCH search space adaptations, etc.
- Provide guarantees for maximum required receiver performance to handle scheduled data formats, such as indication of maximum number of MIMO layers that will be scheduled.
- Avoid unnecessary measurements that reduce UE sleep opportunities, such as measurement reduction in RRC_CONNECTED state for stationary UEs in good signal conditions.
- Relaxing UE measurement requirements (e.g., for radio resource management (RRM), radio link monitoring (RLM), beam failure detection (BFD), etc.) in RRC_CONNECTED, RRC_IDLE, and/or RRC_INACTIVE states.
- Activate unified air interface (UAI) functionality for the UE to indicate specific configuration preferences, etc.
- Reduction of power consumption due to SCells, e.g., by dynamic SCell release/activation/deactivation, SCell dormancy, etc.

As another general principle, UE configurations that provide favorable UE energy consumption or energy efficiency (EE) can impose undesirable effects on network performance and/or other aspects of UE performance. For example, data latency may be increased, UE and cell throughput may be reduced, and/or network signaling overhead may be increased. In order to understand the tradeoffs, the network needs to understand UE EE benefits that accompany the undesirable effects of a UE configuration.

Currently-used UE energy consumption models (e.g., as described in 3GPP TR 38.814) may give the network some qualitative understanding of UE EE benefits of a particular configuration. However, the network lacks information on how a certain configuration actually affects the UE EE and, optionally, UE QoS. Typically, configurations are based on the intuitive understandings such as a 100 ms UE sleep duration will save more energy in comparison to a 50-ms sleep duration.

However, practical UE designs are considerably more complex and varied, and cannot be captured by these simple models. For example, such models do not provide insight into how other configurations affect UE EE, such as choice of BWP and/or CC, using a smaller BWP vs. moving the UE to another carrier, which combination of configured CCs having the same total BW provides best UE EE, etc. In general, answers to these and other similar questions can depend on UE model, manufacturer, chipset, software, RF/antenna configuration, etc.

For example, depending on the UE RF implementation, the particular secondary CCs that are activated may be more important than the number of CCs activated from a UE EE perspective. The specific CCs may be implemented in different RF transceivers (and possibly processing chains) that are independently managed for energy consumption, such that the UE could potentially switch off transceivers/processing chains associated with CCs not in use. Thus, different UE EE can be obtained depending on how the active CCs can be mapped to the independently managed hardware.

Currently, the network has no way to obtain this information from the UE. More generally, there is no mechanism today to determine what is the best EE configuration for a UE, subject to a UE's QoS requirement(s). In other words, the optimum, best, and/or preferred configuration for a UE is necessarily a balance between competing EE and QoS requirements.

Currently, the UE can provide the network with a preferred and/or desired configuration. However, this UE-provided configuration does not consider other factors known only to the network, such as the current traffic conditions and/or beamforming capabilities of the cell serving the UE. This can lead to the UE-provided configuration being inadequate for UE QoS requirements or negatively impacting network performance, while alternative configurations providing similar EE benefits without such disadvantages may remain undiscovered by the UE and the network.

Accordingly, embodiments of the present disclosure provide flexible and efficient techniques for a UE to provide feedback about actual UE energy consumption, EE, and/or QoS impact, for a one or more configurations provided by a network node. The network node (and, optionally, the RAN and/or the CN serving the UE) can use this feedback information to train a machine learning (ML) model that can optimize one or more target metrics for UE EE and/or QoS and use the trained ML model to select configurations for other UEs by inference.

Embodiments of the present disclosure can provide various advantages, benefits, and/or solutions to problems. For example, the network can use the feedback from a first UE to train the model used to select configurations that provide improved UE EE for other UEs, so long as the other UEs have one or more characteristics and/or conditions in common with the first UE (e.g., manufacturer, chipset, software, RF architecture, radio conditions, cell traffic conditions, etc.). As another example, in certain embodiments a UE can provide a relative score for the configuration(s) with revealing sensitive and/or proprietary UE energy consumption information.

As another example, using ML-based techniques, the network can adapt to specific characteristics of UEs (e.g., device type, chipset vendor, software version, etc.) as well as to different feedback metrics provided by different UEs. Moreover, UEs are incentivized to provide accurate feedback metrics since doing so helps train the ML-model used to generate improved configurations for all UEs have the shared characteristic(s) and/or condition(s). Even so, the network can filter UE feedback to remove inaccurate and/or biased inputs.

More generally, embodiments facilitate improved network discovery of configurations that will provide reduced UE energy consumption for a particular QoS requirement, for all UEs that share at least some common characteristics and/or conditions.

Figure 7:
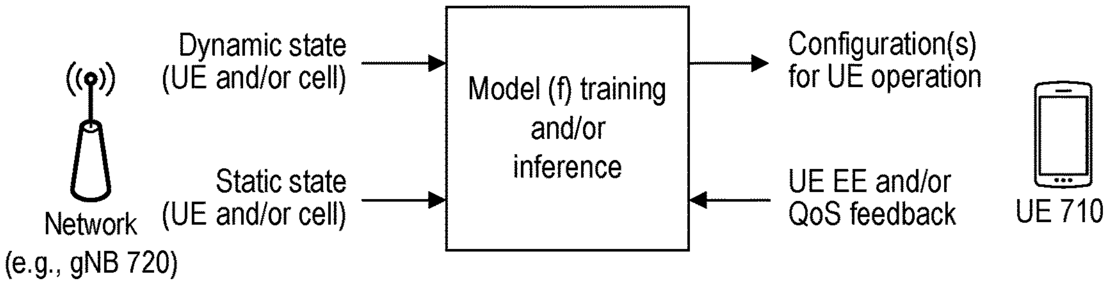
FIG. 7 shows a block diagram of a model-based system according to various embodiments of the present disclosure.

FIG. 7 shows a block diagram of a model-based system according to various embodiments of the present disclosure. In this exemplary system, the network (e.g., RAN nodes, such as gNB 720) provides model inputs including static information about the UE (710) and/or the cell in which the UE is operating. Static information can provide model generalization, enabling a model trained for one cell/UE, to be reused for a similar cell/UE. The static information can also be used when selecting a model. For example, one model might be specific to a certain device vendor, or a certain energy target metric. Some examples of static information are given below:

- Cell static information, such as antenna configuration, cell size, carrier frequency(ies), bandwidth, multiuser MIMO capabilities, etc.
- Cell statistics, such as for block error rate (BLER), modulation and coding scheme (MCS), outer loop adjustments, throughput, signal-to-interference-and-noise (SINR) load, etc.
- UE static information, such as antenna configuration, CA/DC support, transmission mode support, priority level of EE (e.g., low if connected to power outlet), manufacturer, mode, chipset vendor, chipset model, UE class and/or performance category, software version, etc.

In this exemplary system, the network-provided model inputs also include dynamic information about the UE and/or the cell in which the UE is operating. Some examples of dynamic information are given below:

- UE dynamic information
  - Traffic information, e.g., historical and/or forecast;
  - Signal measurements, e.g., RSRP, RSRQ, RSSI, timing advance, etc.;
  - Mobility information, e.g., speed, number of handovers in last x seconds, etc.;
  - Service type and/or QoS requirements;
  - Preferred UE EE configuration;
  - Forecast battery lifetime/remaining battery level;
  - Whether connected to power outlet;
- Cell dynamic information, including traffic information such as:
  - PRB utilization, e.g., for last x seconds before UE connects;
  - Number of connected users, e.g., for last x seconds before UE connects; and
  - Number of bearers, e.g., total or per bearer type The model can be trained based on such information provided by the network. The trained model can then output one or more configurations for a particular UE operating in the cell (e.g., shown in FIG. 7), based on using one or more known characteristics for the particular UE and/or the cell (e.g., static information). The model can also receive as input feedback from the particular UE about UE EE and/or QoS for the one or more configurations provided, which can be used to further train the model.

In some embodiments, the network node (e.g., gNB) serving the cell can train the model and use it for inference. In other embodiments, a first network node (e.g., gNB) that is responsible for setting UE configurations receives the model from a second network node (e.g., another gNB, CN function, OAM, etc.) that is responsible for training. For example, the first network node can be the target node for a UE mobility operation while the second network node can be the source node for the UE mobility operation. In some instances, the second network node might have more updated and/or better trained model than the first network node.

In other embodiments, the training and inference can be performed and/or hosted by network nodes or functions outside of the RAN, such as by newly-defined network functions (NFs) or newly-defined operations for existing NFs in the 5GC. When hosted in this manner, the model would receive inputs from and provide outputs to network nodes serving cells in the RAN.

In some embodiments, the training and inference can be based on artificial intelligence and/or machine learning, subsequent referred to as "AI/ML" for conciseness. A 3GPP study on AI/ML aims to study the functional framework for RAN intelligence enabled by further enhancement of data collection through use cases, examples etc. and identify the potential standardization impacts on current NG-RAN nodes and interfaces. Some specific objectives include high level principles and functional framework for RAN intelligence enabled by AI/ML, as well as identifying benefits of AI/ML-enabled NG-RAN through possible use cases including energy saving, load balancing, mobility management, coverage optimization, etc.

Applicant has recognized that reinforcement learning (RL) is a specific type of AI/ML that may be particularly beneficial for embodiments of the present disclosure. In RL, the model continuously interacts with its environment and is provided implicit (and sometimes delayed) feedback in the form of "reward signals". RL performs short-term reward maximization but can also make decisions that are irrational in the short-term while providing long-term gains. More generally, RI models attempt to maximize expected future reward by exploiting already existing knowledge and exploring the space of actions in different scenarios, e.g., network and/or UE configurations.

Figure 8:
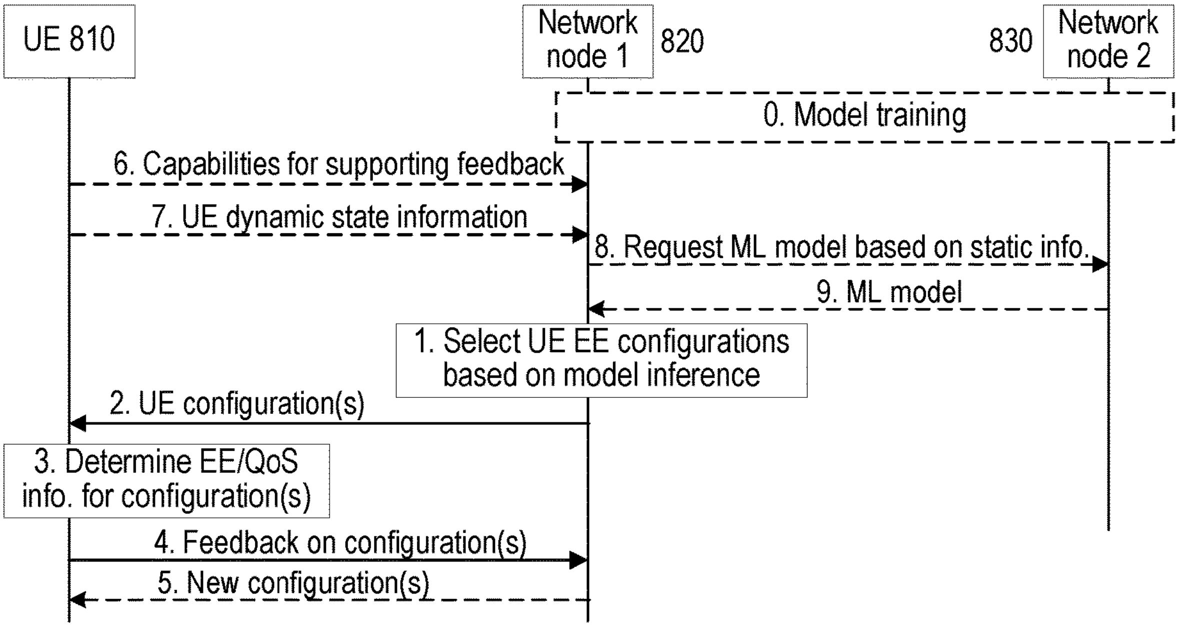
FIG. 8 shows a signal flow between a UE, a first network node, and a second network node, according to various embodiments of the present disclosure.

FIG. 8 shows a signal flow between a UE (810), a first network node (820), and a second network node (830) that illustrates various embodiments of the present disclosure. In this exemplary arrangement, the first network node serves the cell in which the UE is or will be operating, while the second network node can be another RAN node, a CN node or function, an OAM function, etc. Although the operations shown in FIG. 8 are given numerical labels, these are not intended imply an order of execution corresponding to the numbers, unless expressly stated otherwise. Optional operations are indicated by dashed lines.

Operation 0 is model training, discussed above. This can be performed by the first network node or by the second network, in various embodiments. Even so, it is indicated as optional to avoid excluding scenarios in which a fully-trained model is used for subsequent operations.

In operation 1, the first network node selects UE configurations based on model inference, such as discussed briefly above and in more detail below. For example, each configuration can include settings or values for one or more of the following:

- DRX while the UE is operating in a connected state with the wireless network (e.g., cRDX in RRC_CONNECTED);
- DRX while the UE is operating in a non-connected state with the wireless network (e.g., DRX in RRC_IDLE or RRC_INACTIVE);
- WUS while the UE is operating in a connected state with the wireless network;
- PEI while the UE is operating in a non-connected state with the wireless network;
- measurement or monitoring of beams (e.g., SSB, CSI-RS) transmitted by the network node, including for radio resource management (RRM);
- carrier aggregation (CA), including SCell activation/de-activation/dormancy, cross-carrier scheduling, SCell combinations, etc.;
- dual connectivity (DC);
- bandwidth parts (BWP);
- MIMO reception and/or transmission;
- PDCCH monitoring, including cross-slot scheduling, PDCCH skipping, SS switching, etc.; and
- QoS.

In operation 2, the first network node sends the selected configuration(s) to the UE. In operation 3, the UE determines EE and/or QoS information associated with the received configuration(s); this determination can also be based on UE data traffic, e.g., actual and/or predicted. In operation 4, the UE sends feedback about the configuration (s) to the first network node, including the determined EE and/or QoS information (or indication thereof).

FIG. 8 also shows various other optional operations. In operation 5, the first network node can send the UE one or more new configurations based on the received feedback in operation 4. In operation 6, the UE can send the first network node an indication of the UE's capabilities for supporting feedback. In operation 7, the UE can send the first network node an indication of UE dynamic information, such as any of the UE dynamic information discussed above. For example, the first network node can base the configuration (s) sent to the UE in operation 2 (and optionally operation 5) on the indicated capabilities and/or UE dynamic information. Additionally, the indicated capabilities and/or UE dynamic information can be used to train the model.

In some embodiments, the first network node can request the model from the second network node in operation 8, and the second network node responds with the model in operation 9. This arrangement can be used when the second network node trains the model or when the second network node has a version of the model that is more accurate, more recent, and/or better trained than a version used by the first network node.

Various embodiments related to UE feedback associated with the network-provided configurations will now be discussed in more detail.

In some embodiments, the UE can feed back a value between [0, N], where a higher value of N indicates the best score (or vice versa). Such values may be signaled per configuration, e.g., the UE may signal a list of values, each associated with a configuration that may or may not be active at the UE. Alternatively, each value may be associated with a group of configurations, e.g., that share one or more characteristics.

In some embodiments, each value can include could comprise a combination of an EE metric and a QoS metric, or the two may be provided as two separate values. In other embodiments, the UE indicates an order of preference for the configurations.

For determining the energy metric, in one embodiment, the UE may directly measure its energy consumption during an observation period and obtain an average current or power estimate. The UE may subtract other known energy consumption contributions, e.g., due to screen or application processor activity. In another embodiment, the UE may use a detailed model of its energy consumption (e.g., energy levels at different operational states), noting its activity timeline (e.g., sequence of operations, sleep states, transitions, etc.) associated with a received/transmitted data sequence and accumulate the power over the relevant states.

In some embodiments, the UE can also feedback a score for a configuration that was not used. For example, the UE could also estimate a score for a cRDX cycle parameter of 80 ms in addition to a provided configured having a 40 -ms parameter. To estimate the score, the UE may record the actually received data arrival pattern and emulate its processing timeline for same or similar data arrival when configured with a different configuration.

In some embodiments, the network can provide a group of possible configurations (including parameter settings) and the UE provides its feedback on all or a subset of the EE configurations of the group. The UE could estimate the score for each corresponding configuration based on previous experience or other information source, e.g., dry running the configurations, experience shared from other UEs of similar/same architecture/manufacturer/software, etc. For example, the UE can obtain information about experience of other UEs from an external database and/or directly from the other UEs.

In various embodiments, the network can use the feedback to understand UE limitations, such as which aspects of the configurations have the most impact on UE EE and/or QoS. Based on this understanding, the network can provide configurations that further improve EE and/or QoS for the particular UE implementation (e.g., operation 5 in FIG. 8).

In some embodiments, groups of possible configurations may be configured by the network semi-statically, e.g., when a UE connects to a cell, when the UE enters RRC_CONNECTED state, etc. Alternatively, the possible configurations may be changed dynamically depending factors such as the traffic that the UE is transmitting (e.g., based on DRBs configured for the UE by the network), load in the cell, buffer status reported by the UE, etc.

Each configuration provided by the network may be associated with a QoS characteristic (e.g., 5QI) or a combination of QoS characteristics. Multiple configurations may be associated with the same QoS characteristic or the same combination of QoS characteristics. In some embodiments, the UE would provide its feedback only for configurations associated with QoS characteristics that apply to currently UE traffic, currently configured DRBs, etc. In other embodiments, if the UE has current traffic and/or DRBs associated with different QoS characteristics, the UE provides its feedback only for configuration(s) associated with the QoS characteristic of highest priority. For, example if the UE is configured with a default DRB and a higher-priority DRB to carry voice, the UE considers only the configurations associated with the combination of default and voice DRBs, or only the configurations associated with the voice DRB of higher priority.

In some embodiments, the network does not provide a group of possible configurations and the UE provides feedback on configurations and the associated parameter settings. In one variant, the UE may indicate the QoS characteristic(s) that have been considered by the UE when providing the feedback for a particular configuration, such as the QoS characteristic(s) for currently-configured DRBs. In case a certain QoS characteristic has not been considered in the UE feedback, it may be an implicit indication that the UE does not find a configuration that provides suitable EE for the QoS characteristic. The network may use this implicit information to de-configure a DRB and stop the associated QoS flow.

In a related variant, the UE receives a first configuration or a first set of configurations from the network, and then provides a score based on an EE model provided by the network (e.g., as part of a model download) or pre-configured (e.g., as part of 3GPP specification).

In one example, the UE feeds back its consumed energy (e.g., milliwatt-hours), power (e.g., milliwatts), or in some generic unit that is consistent over the UE's reports. The last option may be used to prevent global comparison of absolute UE energy performance. In another example, the UE feeds back a value related to EE in various formats, e.g., percentage, discrete value (e.g., class, label, etc.), absolute, relative to a reference, etc. The network tries to minimize such metric given that the QoS targets established by the network are met. The UE might feedback an indication that the QoS is not satisfactory, indicating that the network should use another configuration.

In various embodiments, the UE can feed back could be a single value for an entire reporting period or a time series of values during the reporting period, with each value corresponding to the measurement period within the reporting period. For example, if the reporting period is 100 ms and if the measurement interval is 10 ms, the UE includes a set of 10 values in the feedback with the first value corresponding to the first 10 ms, the second value corresponding to the next 10 ms, etc. This could be used by the network to correlate with other state parameters collected by the network like traffic pattern during the reporting period and use this information for configuration of other UEs.

In some embodiments, the UE feeds back EE information for a configuration with respect to a reference energy or power consumed by the UE in a reference operating state, e.g., RRC_IDLE state, a sleep state, etc. For example, the EE information can be for operation in connected mode relative to energy consumption for a corresponding time period in RRC_IDLE state. In other embodiments, the reference level may be a well-defined power level in the UE, known to the UE but not necessary to reveal to the network. In other embodiments, the reference may be a configuration either specified in the specification or one that has been provided by the network earlier.

In some embodiments, the UE can provide EE feedback as a delta with respect to a reference score. As an example, if the reference score is for a configuration where the energy consumption and/or QoS are set to pre-configured levels, the delta score (e.g., combined for EE and QoS, or separated for the two) would signify the departure from such reference score. For example, the delta score signaled by the UE may be a numerical value (e.g., between −5 and +5, where −5 signifies the maximum negative departure from the reference and +5 the maximum positive departure with respect to the reference). As another example, the delta score may include or be based on an actual difference between the currently measured energy consumption and the reference level of energy consumption (e.g., in terms of energy/power used) and/or of the currently measured QoS level metrics minus the pre-configured reference QoS level (e.g., in terms of throughput or packet latency).

In some embodiments, the UE feeds back the preferred configuration, and the reason for this selection, for which the UE can indicate the policy that was used by the UE to obtain this decision. With this information the network can gain knowledge about how good the UE's suggestion is relative to the UE situation, and how much the UE selection policy is aligned with the network's operational preferences. As non-limiting examples, the UE may indicate (1) the QoS requirements are met by this configuration, which indicates that meeting the QoS is a top priority for the UE; or (2) operating according to deep power saving mode. The latter can be indicated in case the UE has reach a low residual battery level (e.g., below a threshold). Such an indication can also be used by the network as a trigger to configure the UE to operate according to a more suitable alternative QoS profile. Hence, this information can be used by the network to come up with a configuration that balance between UE QoS and EE.

In some embodiments, the UE may provide feedback (e.g., one or more values or metrics) that compares different configurations (e.g., actually applied and/or candidates) with respect to a particular traffic scenario. Some example comparison setups include:

- current actual UE configuration (measured EE) vs. previous actual UE configuration (measured EE);
- candidate UE configuration (estimated EE) vs. current actual UE configuration (measured EE);
- candidate UE configuration (estimated EE) vs. previous actual UE configuration (measured EE); and
- candidate UE configuration 1 (estimated EE) vs. candidate UE configuration 2 (estimated EE).

In various embodiments, values and/or metrics for candidate configurations can be determined and/or estimated in any of the ways discussed above. In case the UE has been provided multiple configurations associated with the same or similar traffic patterns and/or use cases, the network can request the UE to report its preferred one of the configurations. The network can also request the UE to report a ranking of the multiple configurations in terms of preference.

In some embodiments, the UE can, based on its experienced traffic in a past time window, estimate the best configuration and optionally an EE metric or value for the preferred configuration. For example, the UE should have been configured with another DRX cycle parameter given its QoS requirements and experienced traffic. The network can identify the traffic pattern/state of the past time window and use the learnings to configure a second UE experiencing the same/similar state as the first UE, with the new optimal configuration.

In some embodiments, the network can include a predicted value or metric (e.g., for EE, QoS, or a combination thereof) for a configuration and the UE provides feedback of "true" or "false" (alternately "correct" or "incorrect") for the predicted value or metric. For example, a UE is configured with config-1 and config-2, which is considered a baseline or reference with a metric value of 100. Then the network sends the UE a config-3 with a predicted metric value of 85 and, optionally, a range of uncertainty (e.g., +/−5) associated with the predicted metric. The and the UE could label the predicted metric as true or false after evaluating the new configuration, which can be based on the range of uncertainty if included. If the predicted value is labelled as "false", then the UE can optionally include some additional feedback, such as whether actual score was lower or higher than the one predicted by the network.

In some embodiments, when the network reconfigures the UE, the UE can indicate to the network a relative score expected between the UE's currently used configuration and a different configuration which the UE prefers for ongoing procedures impacting the services executed by the UE. Alternatively, the UE can confirm the validity of the current configuration. Such a reconfiguration event can occur at any of the following:

- when at least one service (e.g., 5QI) is being setup, removed or modified;
- when there is a change in the mapping between QoS flows and DRBs;
- when there is a change in the set of S-NSSAIs to which the services running at the UE are mapped;
- at mobility, e.g., intra-frequency, inter-frequency, inter-RAT, inter-system;
- when roaming between PLMNs;
- when moving from a public network to a private network or vice versa; and
- for quality of experience (QoE) measurements, e.g., a RRC reconfiguration message triggered to start, stop, pause or resume application layer QoE measurements associated with at least one service type (e.g., MTSI, streaming, VR, AR, MBMS, etc.), In the last example above, the UE's QoE measurements can be signaling-based or management-based and the UE can indicate to the network a new preferred energy efficiency configuration.

The UE can provide the feedback on the configurations in various ways according to various embodiments. In some embodiments, the UE provides the feedback as part of higher layer signaling, e.g., RRC signaling or connection setup. For example, the UE receives a first cRDX configuration from the network as part of an RRC signaling procedure (e.g., reconfiguration) and provides its feedback as part of the same RRC signaling procedure. In other embodiments, the UE receives a configuration from broadcast via SI and transmits feedback through dedicated signaling (e.g., RRC). In some embodiments, the UE can provide the feedback as part of lower-layer signaling, e.g., in UCI, MAC CE, etc. transmitted via PUSCH or PUCCH.

In various embodiments, the particular feedback mechanism used by the UE can be configured by the network or pre-determined, e.g., as part of 3GPP specification. For example, the UE can infer the particular feedback mechanism to be used (e.g., RRC, UCI, MAC CE, etc.) based on the mechanism by which it received the configuration(s) to be evaluated (e.g., RRC, broadcast SI, DCI, MAC CE, etc.). Furthermore, the network can also enable or disable any particular UE feedback mechanism.

In some embodiments, time-frequency resources used for UE feedback can be pre-configured (e.g., the next slot after reception of the configuration(s), etc.) or explicitly or implicitly indicated by the network. As an example, the network can indicate the feedback resources together with the configuration(s) to be evaluated by the UE.

As illustrated in FIG. 8, the UE can feed back EE and/or QoS information associated with a configuration in response to receiving the configuration from the network. Additionally, the UE can feed back EE and/or QoS information associated with a configuration in based on any of the following events and/or conditions:

UE/network state changes, changed traffic patterns, new applications activated, configuration/deconfiguration of UE DRBs or SRBs, etc.
UE transitioning between RRC states, at handover event, at update/change in the served QoS flows, etc.;
Change in QoS and/or EE relative to a threshold, e.g., feedback when a newly provided configuration leads to EE and/or QoS metric that changes (e.g., decreases or increases) more than a network-configured or pre-configured threshold as compared to another configuration (see various examples of comparisons discussed above);
Upon network-configured events, e.g., the UE may be configured to report feedback every time energy consumption goes above (or EE below) a threshold, and/or if QoS (e.g., throughput) go below a threshold;
Periodically or semi-statically, as configured by the network;
Change in network slice used by the UE; and
Updated QoE measurement configuration.

In various embodiments, the network uses the feedback from the UE to evaluate the best possible configuration to signal to the UE, which maximizes all the parameters taken as target, e.g., EE and/or QoS levels. The network may perform one or more of the following actions given the feedback from the UE, as described below.

In some embodiments, the network can determine the best configuration for a UE, considering one or more of the following:

UE's known capabilities;
UE's current conditions, e.g., cell status, radio environment, services used by the UE, etc.; and
UE's known characteristics, e.g., a model version group identifiable by means of the Masked IMEISV parameter, defined in 3GPP TS 36.413 (v16.5.0).

In some embodiments, the network can determine the best configuration that maximizes EE and other target parameters, including QoS, for a group of UEs such as all UEs served by a cell, all UEs served by one or more cells by a particular network slice, etc. For example, it can determine the best configuration that maximizes EE for a certain QoS profile (e.g., 5QI) or a combination of QoS profiles (e.g., 5QIs mapped to DRBs that can be configured to the UE).

In some embodiments, the network can determine that none of the configurations provided to a UE achieves desired and/or acceptable performance for the configured targets. The network in this case may use the feedback from the UEs to determine the best configuration out of those supported, which new configuration should be supported, and/or which could maximize the overall performance once provided to the UE(s) and given one or more 5QIs. The network may also decide to de-configure certain DRBs and/or SRBs in case the UE does not indicate an enough suitable configuration for such DRBs or SRBs.

Once a network node serving a cell gains knowledge of the configurations that are preferred, optimal, acceptable, supported, and/or not supported by a particular UE under certain conditions, the network node can signal this information to a management system, which in turn may provide this information to other network nodes. Alternatively, the network node can signal the information directly to network nodes serving other cells, e.g., via Xn interfaces.

Figure 9:
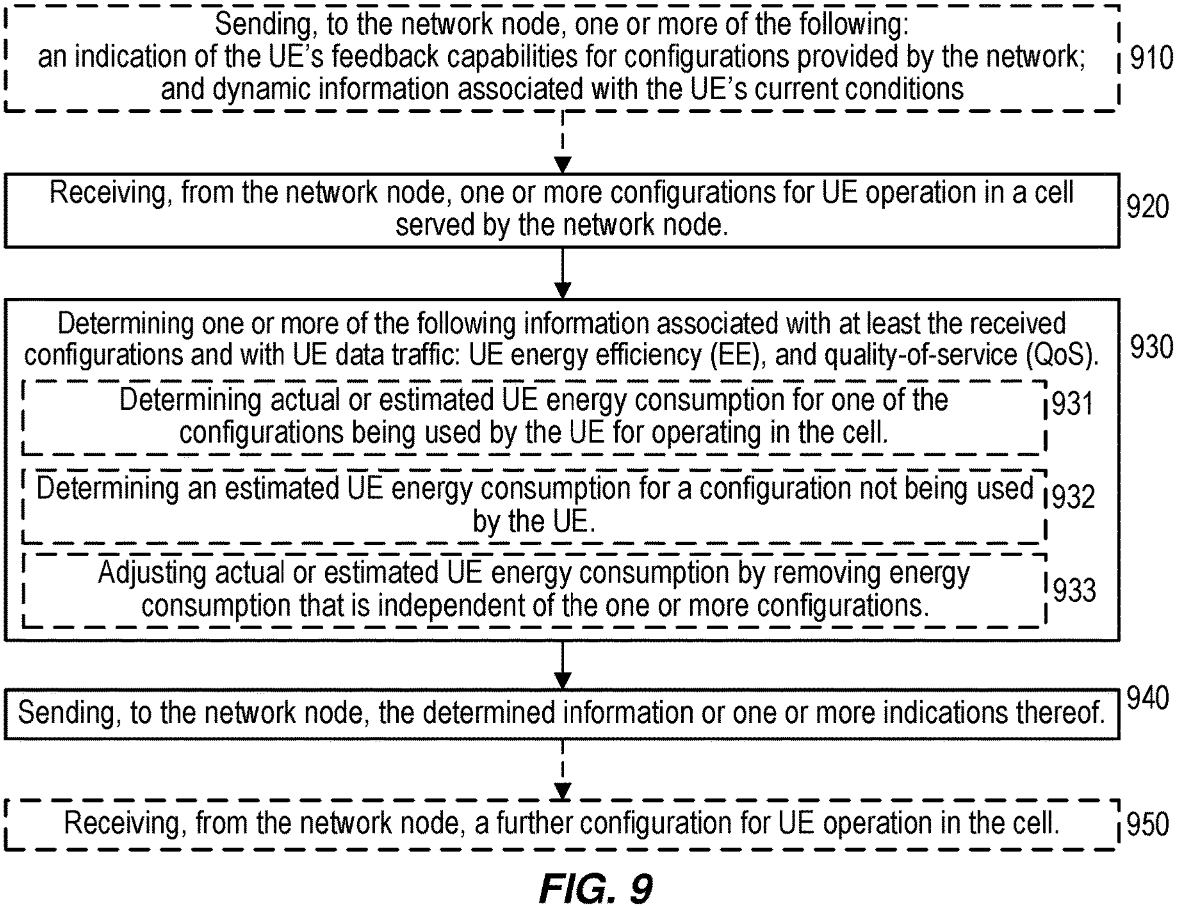
FIG. 9 shows a flow diagram of an exemplary method for a UE (e.g., wireless device), according to various embodiments of the present disclosure.
Figure 10:
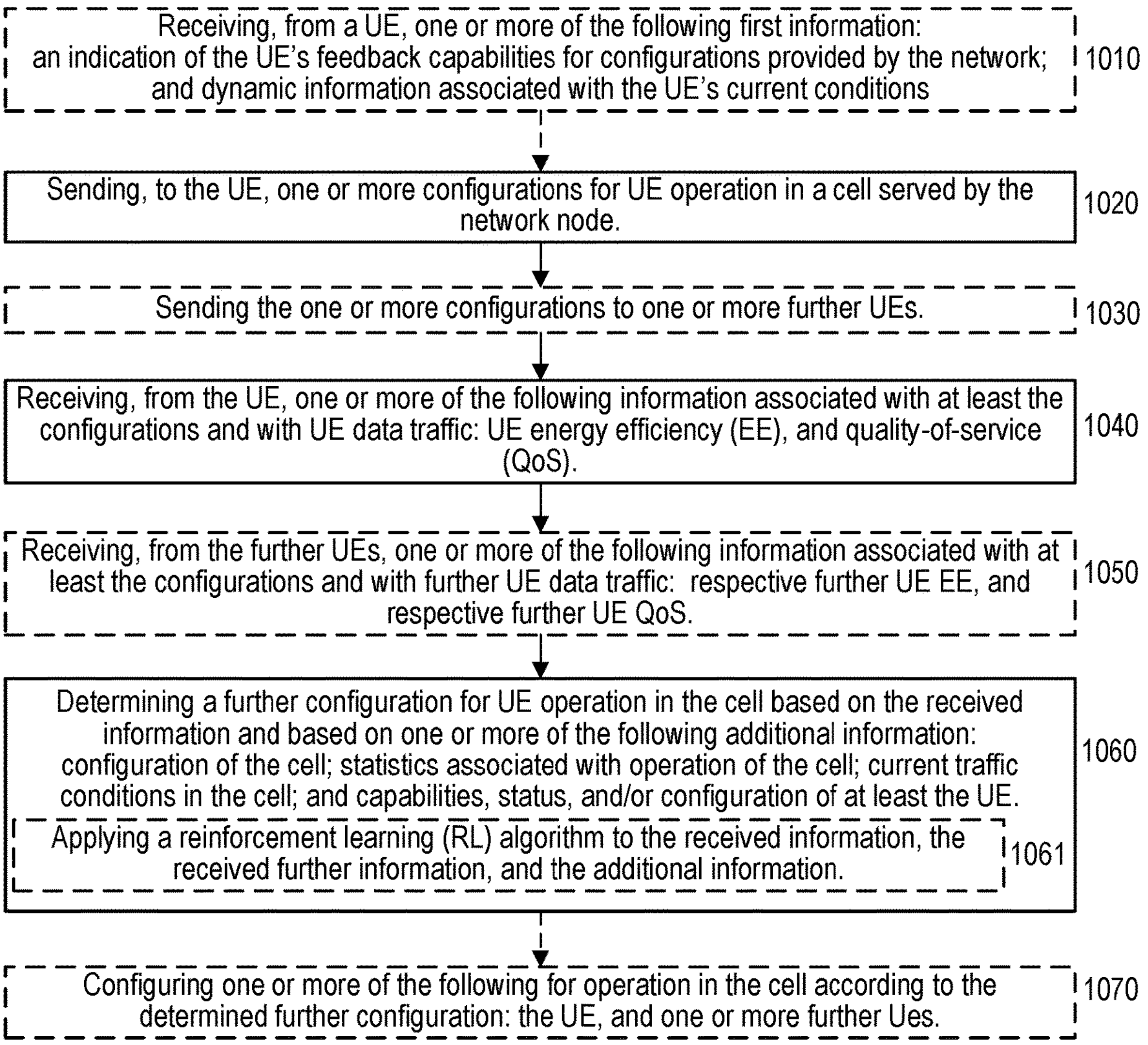
FIG. 10 shows a flow diagram of an exemplary method for a network node (e.g., base station, eNB, gNB, ng-eNB, etc.), according to various embodiments of the present disclosure.

Various features of the embodiments described above correspond to various operations illustrated in FIGS. 9-10, which show exemplary methods (e.g., procedures) for a UE and a network node, respectively. In other words, various features of the operations described below correspond to various embodiments described above. Furthermore, the exemplary methods shown in FIGS. 9-10 can be used cooperatively to provide various benefits, advantages, and/or solutions to problems described herein. Although FIGS. 9-10 show specific blocks in particular orders, the operations of the exemplary methods can be performed in different orders than shown and can be combined and/or divided into blocks having different functionality than shown. Optional blocks or operations are indicated by dashed lines.

In particular, FIG. 9 shows an exemplary method (e.g., procedure) for a UE configured to operate in a cell of the wireless network, according to various embodiments of the present disclosure. The exemplary method can be performed by a UE (e.g., wireless device) such as described elsewhere herein.

The exemplary method can include the operations of block 920, where the UE can receive, from a network node, one or more configurations for UE operation in the cell. The exemplary method can also include the operations of block 930, where the UE can determine one or more of the following information associated with at least the received configurations and with UE data traffic: UE energy efficiency (EE), and quality-of-service (QoS). The exemplary method can also include the operations of block 940, where the UE can send, to the network node, the determined information or one or more indications thereof. In some embodiments, the exemplary method can also include the operations of block 950, where the UE can receive, from the network node, a further configuration for UE operation in the cell.

In some embodiments, each configuration includes settings or values for one or more of the following:

DRX while the UE is operating in a connected state with the wireless network;
DRX while the UE is operating in a non-connected state with the wireless network;
WUS while the UE is operating in a non-connected state with the wireless network;
measurement or monitoring of beams and/or RS transmitted by the network node;
CA, DC, and/or BWPs;
MIMO reception and/or transmission;
PDCCH monitoring; and
QoS.

In some embodiments, determining the UE EE information associated with each of the received configurations in block 930 can include the operations of sub-block 931, where the UE can determine one of the following for one of the configurations being used by the UE for operating in the cell:

an actual UE energy consumption based on operating current measurements during an observation period; or
an estimated UE energy consumption based on durations spent by the UE in each of a plurality of operating states during the observation period, and based on a model for UE energy consumption in each of the plurality of operating states.

In some embodiments, determining the UE EE information associated with each of the received configurations in block 930 can include the operations of sub-block 932, where the UE can determine an estimated UE energy consumption for a configuration not being used by the UE based on one or more of the following:

a database storing energy consumption information for at least one of a manufacturer, a model number, and a chipset associated with the UE;

actual UE energy consumption during previous operation in the configuration or in a configuration similar to the configuration; and estimated durations spent by the UE in each of a plurality of operating states and a model for UE energy consumption in each of the plurality of operating states.

In some of these embodiments, determining the UE EE information associated with each of the received configurations in block 930 can also include the operations of sub-block 933, where the UE can adjust actual or estimated UE energy consumption by removing energy consumption that is independent of the one or more configurations (e.g., for user interface, such as a display).

In some embodiments, each of the configurations can include a QoS identifier associated with one or more QoS characteristics. In such case, the UE determines (e.g., in block 930) and sends (e.g., in block 940) UE EE information only for the configurations having a QoS identifier and/or QoS characteristics that correspond to an established data radio bearer (DRB) for the UE and/or to data traffic of one or more UE applications.

In some embodiments, the determined information or one or more indications thereof sent to the network node (e.g., in block 940) can include one or more of the following:

respective absolute EE ratings for the received configurations;

one absolute EE rating for a received configuration that is being used by the UE;

respective EE ratings of the received configurations relative to a reference EE rating;

respective EE differences between the received configurations and a configuration being used by the UE;

an EE difference between two of the received configurations;

actual or estimated absolute UE energy consumption for the received configurations; and actual or estimated UE energy consumption for the received configurations, relative to a reference UE energy consumption.

In some of these embodiments, each received configuration can include a corresponding reference EE rating, which can include an estimated range of absolute EE ratings for the corresponding configuration. In such embodiments, the indications sent to the network node comprise indications of whether actual EE ratings of the receive configurations are within the respective estimated ranges of absolute EE ratings.

In other of these embodiments, the reference UE energy consumption can be one of the following:

actual UE energy consumption when operating in a non-connected state with the wireless network; or actual or estimated UE energy consumption when operating in a reference configuration.

In some embodiments, the determined information or one or more indications thereof sent to the network node (e.g., in block 940) can also include one or more of the following:

respective absolute QoS ratings for the received configurations;

one absolute QoS rating for a received configuration that is being used by the UE;

respective QoS differences between the received configurations and a configuration being used by the UE; and a QoS difference between two of the received configurations.

In some of these embodiments, the absolute EE rating and the absolute QoS rating associated with the same received configuration are represented by a combined EE/QoS rating.

In some embodiments, the received configurations can include a plurality of configurations previously used by the UE for data traffic patterns corresponding to the UE data traffic. In such embodiments, the determined information or one or more indications thereof sent to the network node include an indication of one of the following:

a UE-preferred one of the previously-used configurations, or an order of UE preference of the previously-used configurations.

In some embodiments, determining the information (e.g., in block 930) is based on UE data traffic during a single observation period or during each of a plurality of non-overlapping measurement periods comprising the single observation period.

In some embodiments, the determined information or one or more indications thereof sent to the network node (e.g., in block 940) can include an indication of a UE-preferred configuration not included in the received configurations and one or more of the following:

UE EE and/or QoS information associated with the UE-preferred configuration; and an indication of one or more criteria for selecting the UE-preferred configuration.

In some of these embodiments, the UE-preferred configuration is associated within one of the following:

change in one or more services for the UE;

change in mapping between QoS flows and DRBs for the UE;

change in mapping between network slices and services for the UE;

UE mobility operation;

UE roaming between PLMNs;

UE roaming between a PLMN and a private network; or reconfiguration of UE QoE measurements.

In other of these embodiments, the indication of the one or more criteria indicates UE prioritization of QoS for the UE data traffic or of EE due to remaining energy in the UE's battery. In some variants of these embodiments, the further configuration (e.g., received in block 950) provides an increased EE or an increased QoS, relative to the UE's current configuration, based on whether the indication indicates UE prioritization of QoS or EE, respectively. In some cases, the further configuration is different than the UE-preferred configuration and/or the UE-preferred configuration is not supported in the cell.

In some embodiments, one or more of the following applies to the further configuration (e.g., received in block 950):

it includes at least one SRB or DRB not currently configured for the UE; and it excludes at least one SRB or DRB currently configured for the UE.

In some embodiments, the one or more configurations are received (e.g., in block 920) as one of the following:

SI broadcast in the cell;

at least one unicast or dedicated RRC message;

at least one MAC CE; or at least one DCI message.

In some embodiments, the determined information or one or more indications thereof are sent to the network node (e.g., in block 940) as one of the following:

at least one unicast or dedicated RRC message;

at least one MAC CE; or at least one DCI message.

In some embodiments, the determined information or one or more indications thereof are sent to the network node (e.g., in block 940) responsive to one or more of the following:

- receiving the configurations (e.g., in block 920);
- a change in the UE data traffic;
- UE activation or deactivation of applications;
- UE change between a connected state and a non-connected state with the wireless network;
- UE mobility operation;
- change in one or more of the following used by the UE: network slice, QoS flow, DRB, SRB, and QoE measurement configuration;
- actual or estimated UE energy consumption for a configuration used by the UE is greater than a first threshold;
- QoS for a configuration used by the UE is less than a second threshold; and
- a network-configured periodic or semi-statistical schedule.

In some embodiments, the exemplary method can also include the operations of block 910, where the UE can send, to the network node, an indication of the UE's feedback capabilities for configurations provided by the network and/or dynamic information associated with the UE's current conditions. Examples of these operations are shown in FIG. 8 (operations 6-7).

In addition, FIG. 10 shows an exemplary method (e.g., procedure) for a network node configured to serve a cell of a wireless network, according to various embodiments of the present disclosure. The exemplary method can be performed by a network node (e.g., base station, eNB, gNB, ng-eNB, etc.) such as described elsewhere herein.

The exemplary method can include the operations of block 1020, where the network node can send, to a UE, one or more configurations for UE operation in the cell. The exemplary method can also include the operations of block 1040, where the network node can receive, from the UE, one or more of the following information associated with at least the configurations and with UE data traffic: UE EE, and QoS. The exemplary method can also include the operations of block 1060, where the network node can determine a further configuration for UE operation in the cell based on the received information and based on one or more of the following additional information: configuration of the cell; statistics associated with operation of the cell; current traffic conditions in the cell; and capabilities, status, and/or configuration of at least the UE.

In some embodiments, each configuration includes settings or values for one or more of the following:

- DRX while the UE is operating in a connected state with the wireless network;
- DRX while the UE is operating in a non-connected state with the wireless network;
- WUS while the UE is operating in a non-connected state with the wireless network;
- measurement or monitoring of beams and/or reference signals transmitted by the network node;
- CA, DC, and/or BWPs;
- MIMO reception and/or transmission;
- PDCCH monitoring; and
- QoS.

In some embodiments, the configuration of the cell can include one or more of the following parameters: cell size, carrier frequency, bandwidth, multi-user multi-input multi-output (MU-MIMO) capabilities.

In some embodiments, the statistics associated with operation of the cell can be based on one or more of the following parameters: BLER, MCS, power control outer loop adjustments, data throughput, SINR, and traffic load.

In some embodiments, the current traffic conditions in the cell are represented by one or more of the following parameters: traffic load during a most recent duration, number of UEs in a connected state with the wireless network during the most recent duration, signal quality measured by UEs during the most recent duration, number of mobility operations by UEs during the most recent duration, and number and/or type of radio bearers currently established for UEs.

In some embodiments, the capabilities, status, and/or configuration of at least the UE include any of the following: UE antenna configuration, UE energy source, UE manufacturer and/or model, UE chipset manufacturer and/or model, UE software version, UE class, UE performance category, and UE support for one or more transmission modes used in the cell.

In some embodiments, the received information (e.g., in block 1040) includes one or more of the following:

- respective absolute EE ratings for the received configurations;
- one absolute EE rating for a received configuration that is being used by the UE;
- respective EE ratings of the received configurations relative to a reference EE rating;
- respective EE differences between the received configurations and a configuration being used by the UE;
- an EE difference between two of the received configurations;
- actual or estimated absolute UE energy consumption for the received configurations; and
- actual or estimated UE energy consumption for the received configurations, relative to a reference UE energy consumption.

In some of these embodiments, each configuration can include a corresponding reference EE rating, which can include an estimated range of absolute EE ratings for the corresponding configuration. In such embodiments, the received information (e.g., in block 1040) includes indications of whether actual EE ratings of the receive configurations are within the respective estimated ranges of absolute EE ratings.

In other of these embodiments, the reference UE energy consumption can be one of the following:

- actual UE energy consumption when operating in a non-connected state with the wireless network; or
- actual or estimated UE energy consumption when operating in a reference configuration.

In some embodiments, the received information (e.g., in block 1040) can also include one or more of the following:

- respective absolute QoS ratings for the received configurations;
- one absolute QoS rating for a received configuration that is being used by the UE;
- respective QoS differences between the received configurations and a configuration being used by the UE; and
- a QoS difference between two of the received configurations.

In some of these embodiments, the absolute EE rating and the absolute QoS rating associated with the same configuration are represented by a combined EE/QoS rating.

In some embodiments, the configurations can include a plurality of configurations previously used by the UE for data traffic patterns corresponding to the UE data traffic. In such embodiments, the received information (e.g., in block 1040) includes an indication of one of the following:

a UE-preferred one of the previously-used configurations, or an order of UE preference of the previously-used configurations.

In some embodiments, the received information (e.g., in block 1040) comprises one of the following:

a single set of UE EE and/or QoS information associated with a single observation period, or a plurality of sets of UE EE and/or QoS information associated with a corresponding plurality of non-overlapping measurement periods comprising the single observation period.

In some of these embodiments, determining the further configuration for UE operation in the cell (e.g., in block 1060) can include the network node correlating the plurality of sets of UE EE and/or QoS information with a corresponding plurality of sets of the additional information associated with the respective measurement periods.

In some embodiments, the received information (e.g., in block 1040) can include an indication of a UE-preferred configuration not included in the configurations and one or more of the following:

UE EE and/or QoS information associated with the UE-preferred configuration; and an indication of one or more criteria for selecting the UE-preferred configuration.

In some of these embodiments, the UE-preferred configuration is associated with one of the following:

change in one or more services for the UE;

change in mapping between QoS flows and DRBs for the UE;

change in mapping between network slices and services for the UE;

UE mobility operation;

UE roaming between PLMNs;

UE roaming between a PLMN and a private network; or reconfiguration of UE QoE measurements.

In other of these embodiments, the indication of the one or more criteria indicates UE prioritization of QoS for the UE data traffic or of EE due to remaining energy in the UE's battery. In some variants of these embodiments, the further configuration is for the UE and provides an increased EE or an increased QoS, relative to the UE's current configuration, based on whether the indication indicates UE prioritization of QoS or EE, respectively. In some cases, the further configuration is different than the UE-preferred configuration and/or the UE-preferred configuration is not supported in the cell.

In some embodiments, one or more of the following applies to the further configuration (e.g., determined in block 1060):

it includes at least one SRB or DRB not currently configured for the UE; and it excludes at least one SRB or DRB currently configured for the UE.

In some embodiments, the exemplary method can also include the operations of blocks 1030 and 1050. In block 1030, the network node can send the one or more configurations to one or more further UEs. In block 1050, the network node can receive, from the further UEs, one or more of the following further information associated with at least the configurations and with further UE data traffic: respective further UE EE, and respective further UE QoS. In such embodiments, determining the further configuration for UE operation in the cell (e.g., in block 1060) can include the operations of sub-block 1061, where the network node can apply a reinforcement learning (RL) algorithm to the received information (e.g., in block 1040), the received further information (e.g., in block 1050), and the additional information. In some of these embodiments, the further configuration can be for all UEs operating in the cell, all UEs served by a particular network slice, or all UEs associated with a particular QoS profile.

In some embodiments, the one or more configurations are sent (e.g., in block 1020 and, optionally, block 1050) as one of the following:

SI broadcast in the cell;

at least one unicast or dedicated RRC message;

at least one MAC CE; or at least one DCI message.

In some embodiments, the information is received (e.g., in block 1040) as one of the following:

at least one unicast or dedicated RRC message;

at least one MAC CE; or at least one DCI message.

In some embodiments, receiving the information (e.g., in block 1040) is responsive to one or more of the following:

sending the configurations (e.g., in block 1020);

a change in the UE data traffic;

UE activation or deactivation of applications;

UE change between a connected state and a non-connected state with the wireless network;

UE mobility operation;

change in one or more of the following used by the UE: network slice, QoS flow, DRB, SRB, and QoE measurement configuration;

actual or estimated UE energy consumption for a configuration used by the UE is greater than a first threshold;

QoS for a configuration used by the UE is less than a second threshold; and a network-configured periodic or semi-statistical schedule.

In some embodiments, the exemplary method can also include the operations of block 1070, where the network node can configure one or more of the following for operation in the cell according to the determined further configuration: the UE, and one or more further UEs. In some embodiments, the exemplary method can also include the operations of block 1010, where the network node can receive, from the UE, one or more of the following information:

an indication of the UE's feedback capabilities for configurations provided by the network; and dynamic information associated with the UE's current conditions.

Examples of these operations are shown in FIG. 8 (operations 6-7). In such case, the one or more configurations sent to the UE (e.g., in block 1020) are based on the received information.

Although various embodiments are described above in terms of methods, techniques, and/or procedures, the person of ordinary skill will readily comprehend that such methods, techniques, and/or procedures can be embodied by various combinations of hardware and software in various systems, communication devices, computing devices, control devices, apparatuses, non-transitory computer-readable media, computer program products, etc.

Figure 11:
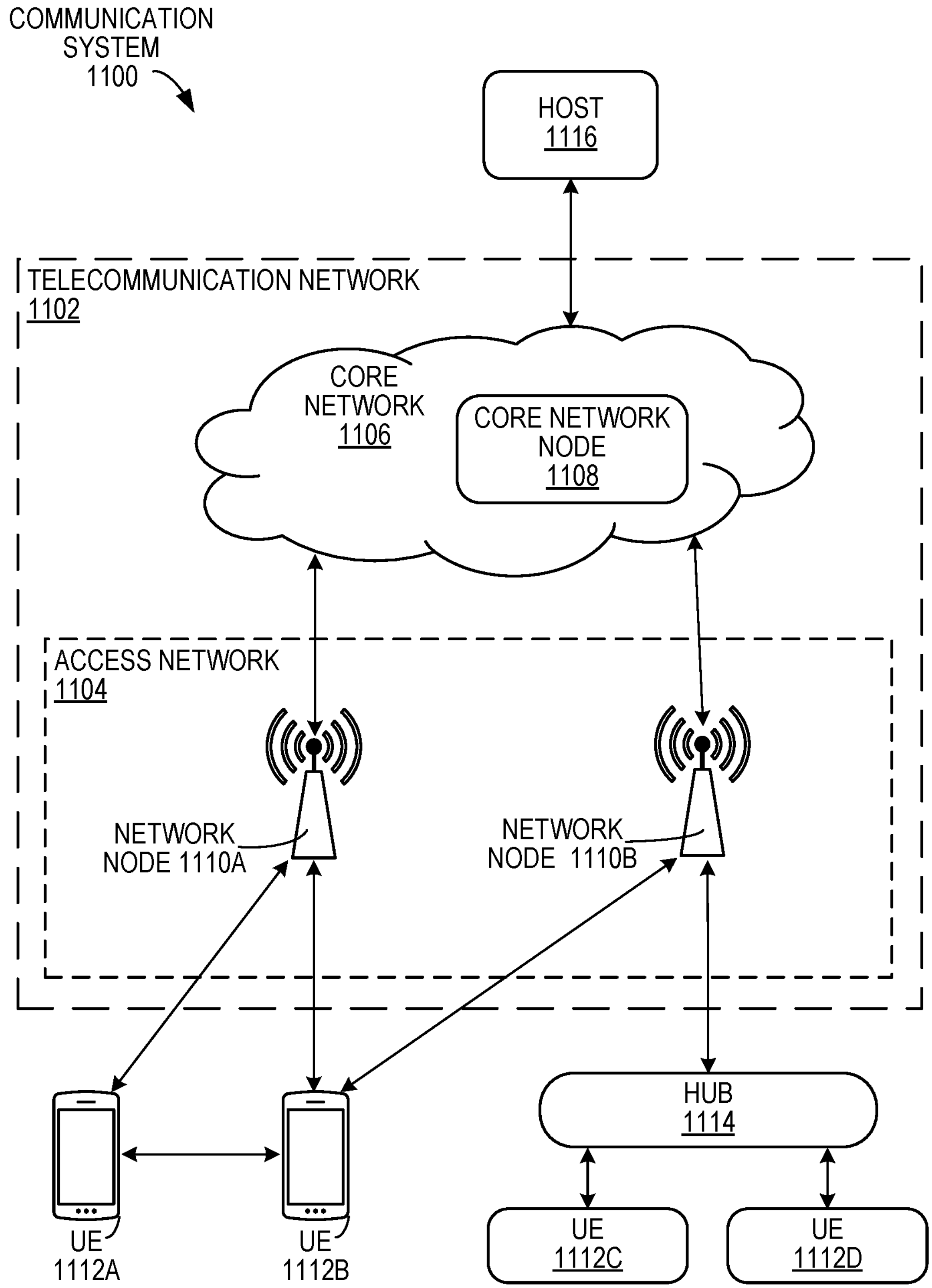
FIG. 11 shows a communication system according to various embodiments of the present disclosure.

FIG. 11 shows an example of a communication system 1100 in accordance with some embodiments. In the example, the communication system 1100 includes a telecommunication network 1102 that includes an access network 1104, such as a radio access network (RAN), and a core network 1106, which includes one or more core network nodes 1108. The access network 1104 includes one or more access network nodes, such as network nodes 1110*a* and 1110*b* (one or more of which may be generally referred to as network nodes 1110), or any other similar $3^{rd}$ Generation Partnership Project (3GPP) access node or non-3GPP access point. The network nodes 1110 facilitate direct or indirect connection of user equipment (UE), such as by connecting UEs 1112*a*, 1112*b*, 1112*c*, and 1112*d* (one or more of which may be generally referred to as UEs 1112) to the core network 1106 over one or more wireless connections.

Example wireless communications over a wireless connection include transmitting and/or receiving wireless signals using electromagnetic waves, radio waves, infrared waves, and/or other types of signals suitable for conveying information without the use of wires, cables, or other material conductors. Moreover, in different embodiments, the communication system 1100 may include any number of wired or wireless networks, network nodes, UEs, and/or any other components or systems that may facilitate or participate in the communication of data and/or signals whether via wired or wireless connections. The communication system 1100 may include and/or interface with any type of communication, telecommunication, data, cellular, radio network, and/or other similar type of system.

The UEs 1112 may be any of a wide variety of communication devices, including wireless devices arranged, configured, and/or operable to communicate wirelessly with the network nodes 1110 and other communication devices. Similarly, the network nodes 1110 are arranged, capable, configured, and/or operable to communicate directly or indirectly with the UEs 1112 and/or with other network nodes or equipment in the telecommunication network 1102 to enable and/or provide network access, such as wireless network access, and/or to perform other functions, such as administration in the telecommunication network 1102.

In the depicted example, the core network 1106 connects the network nodes 1110 to one or more hosts, such as host 1116. These connections may be direct or indirect via one or more intermediary networks or devices. In other examples, network nodes may be directly coupled to hosts. The core network 1106 includes one more core network nodes (e.g., core network node 1108) that are structured with hardware and software components. Features of these components may be substantially similar to those described with respect to the UEs, network nodes, and/or hosts, such that the descriptions thereof are generally applicable to the corresponding components of the core network node 1108. Example core network nodes include functions of one or more of a Mobile Switching Center (MSC), Mobility Management Entity (MME), Home Subscriber Server (HSS), Access and Mobility Management Function (AMF), Session Management Function (SMF), Authentication Server Function (AUSF), Subscription Identifier De-concealing function (SIDF), Unified Data Management (UDM), Security Edge Protection Proxy (SEPP), Network Exposure Function (NEF), and/or a User Plane Function (UPF).

The host 1116 may be under the ownership or control of a service provider other than an operator or provider of the access network 1104 and/or the telecommunication network 1102 and may be operated by the service provider or on behalf of the service provider. The host 1116 may host a variety of applications to provide one or more service. Examples of such applications include live and pre-recorded audio/video content, data collection services such as retrieving and compiling data on various ambient conditions detected by a plurality of UEs, analytics functionality, social media, functions for controlling or otherwise interacting with remote devices, functions for an alarm and surveillance center, or any other such function performed by a server.

As a whole, the communication system 1100 of FIG. 11 enables connectivity between the UEs, network nodes, and hosts. In that sense, the communication system may be configured to operate according to predefined rules or procedures, such as specific standards that include, but are not limited to: Global System for Mobile Communications (GSM); Universal Mobile Telecommunications System (UMTS); Long Term Evolution (LTE), and/or other suitable 2G, 3G, 4G, 5G standards, or any applicable future generation standard (e.g., 6G); wireless local area network (WLAN) standards, such as the Institute of Electrical and Electronics Engineers (IEEE) 802.11 standards (WiFi); and/or any other appropriate wireless communication standard, such as the Worldwide Interoperability for Microwave Access (WiMax), Bluetooth, Z-Wave, Near Field Communication (NFC) ZigBee, LiFi, and/or any low-power wide-area network (LPWAN) standards such as LoRa and Sigfox.

In some examples, the telecommunication network 1102 is a cellular network that implements 3GPP standardized features. Accordingly, the telecommunications network 1102 may support network slicing to provide different logical networks to different devices that are connected to the telecommunication network 1102. For example, the telecommunications network 1102 may provide Ultra Reliable Low Latency Communication (URLLC) services to some UEs, while providing Enhanced Mobile Broadband (eMBB) services to other UEs, and/or Massive Machine Type Communication (mMTC)/Massive IoT services to yet further UEs.

In some examples, the UEs 1112 are configured to transmit and/or receive information without direct human interaction. For instance, a UE may be designed to transmit information to the access network 1104 on a predetermined schedule, when triggered by an internal or external event, or in response to requests from the access network 1104. Additionally, a UE may be configured for operating in single- or multi-RAT or multi-standard mode. For example, a UE may operate with any one or combination of Wi-Fi, NR (New Radio) and LTE, i.e., being configured for multi-radio dual connectivity (MR-DC), such as E-UTRAN (Evolved-UMTS Terrestrial Radio Access Network) New Radio-Dual Connectivity (EN-DC).

In the example, the hub 1114 communicates with the access network 1104 to facilitate indirect communication between one or more UEs (e.g., UE 1112*c* and/or 1112*d*) and network nodes (e.g., network node 1110*b*). In some examples, the hub 1114 may be a controller, router, content source and analytics, or any of the other communication devices described herein regarding UEs. For example, the hub 1114 may be a broadband router enabling access to the core network 1106 for the UEs. As another example, the hub 1114 may be a controller that sends commands or instructions to one or more actuators in the UEs. Commands or instructions may be received from the UEs, network nodes 1110, or by executable code, script, process, or other instructions in the hub 1114. As another example, the hub 1114 may be a data collector that acts as temporary storage for UE data and, in some embodiments, may perform analysis or other processing of the data. As another example, the hub 1114 may be a content source. For example, for a UE that is a VR headset, display, loudspeaker or other media delivery device, the hub 1114 may retrieve VR assets, video, audio, or other media or data related to sensory information via a network node, which the hub 1114 then provides to the UE either directly, after performing local processing, and/or after adding additional local content. In still another example, the hub 1114 acts as a proxy server or orchestrator for the UEs, in particular in if one or more of the UEs are low energy IoT devices.

The hub 1114 may have a constant/persistent or intermittent connection to the network node 1110*b*. The hub 1114 may also allow for a different communication scheme and/or schedule between the hub 1114 and UEs (e.g., UE 1112*c* and/or 1112*d*), and between the hub 1114 and the core network 1106. In other examples, the hub 1114 is connected to the core network 1106 and/or one or more UEs via a wired connection. Moreover, the hub 1114 may be configured to connect to an M2M service provider over the access network 1104 and/or to another UE over a direct connection. In some scenarios, UEs may establish a wireless connection with the network nodes 1110 while still connected via the hub 1114 via a wired or wireless connection. In some embodiments, the hub 1114 may be a dedicated hub—that is, a hub whose primary function is to route communications to/from the UEs from/to the network node 1110*b*. In other embodiments, the hub 1114 may be a non-dedicated hub—that is, a device which is capable of operating to route communications between the UEs and network node 1110*b*, but which is additionally capable of operating as a communication start and/or end point for certain data channels.

Figure 12:
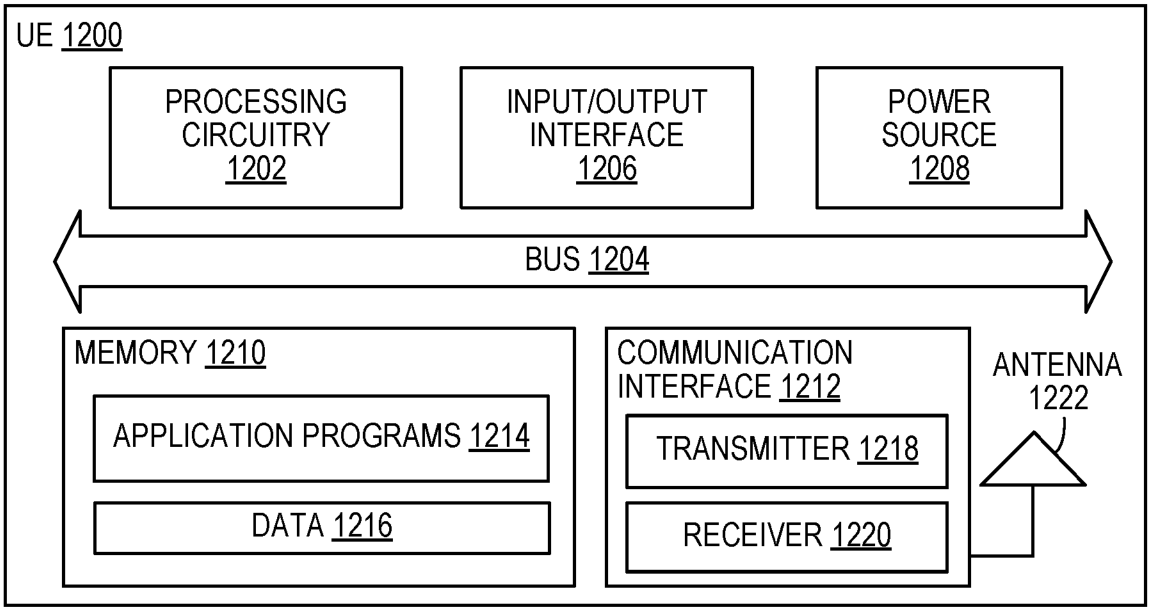
FIG. 12 shows a UE according to various embodiments of the present disclosure.

FIG. 12 shows a UE 1200 in accordance with some embodiments. As used herein, a UE refers to a device capable, configured, arranged and/or operable to communicate wirelessly with network nodes and/or other UEs. Examples of a UE include, but are not limited to, a smart phone, mobile phone, cell phone, voice over IP (VoIP) phone, wireless local loop phone, desktop computer, personal digital assistant (PDA), wireless cameras, gaming console or device, music storage device, playback appliance, wearable terminal device, wireless endpoint, mobile station, tablet, laptop, laptop-embedded equipment (LEE), laptop-mounted equipment (LME), smart device, wireless customer-premise equipment (CPE), vehicle-mounted or vehicle embedded/integrated wireless device, etc. Other examples include any UE identified by the 3rd Generation Partnership Project (3GPP), including a narrow band internet of things (NB-IoT) UE, a machine type communication (MTC) UE, and/or an enhanced MTC (eMTC) UE.

A UE may support device-to-device (D2D) communication, for example by implementing a 3GPP standard for sidelink communication, Dedicated Short-Range Communication (DSRC), vehicle-to-vehicle (V2V), vehicle-to-infrastructure (V2I), or vehicle-to-everything (V2X). In other examples, a UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter).

The UE 1200 includes processing circuitry 1202 that is operatively coupled via a bus 1204 to an input/output interface 1206, a power source 1208, a memory 1210, a communication interface 1212, and/or any other component, or any combination thereof. Certain UEs may utilize all or a subset of the components shown in FIG. 12. The level of integration between the components may vary from one UE to another UE. Further, certain UEs may contain multiple instances of a component, such as multiple processors, memories, transceivers, transmitters, receivers, etc.

The processing circuitry 1202 is configured to process instructions and data and may be configured to implement any sequential state machine operative to execute instructions stored as machine-readable computer programs in the memory 1210. The processing circuitry 1202 may be implemented as one or more hardware-implemented state machines (e.g., in discrete logic, field-programmable gate arrays (FPGAs), application specific integrated circuits (ASICs), etc.); programmable logic together with appropriate firmware; one or more stored computer programs, general-purpose processors, such as a microprocessor or digital signal processor (DSP), together with appropriate software; or any combination of the above. For example, the processing circuitry 1202 may include multiple central processing units (CPUs).

In the example, the input/output interface 1206 may be configured to provide an interface or interfaces to an input device, output device, or one or more input and/or output devices. Examples of an output device include a speaker, a sound card, a video card, a display, a monitor, a printer, an actuator, an emitter, a smartcard, another output device, or any combination thereof. An input device may allow a user to capture information into the UE 1200. Examples of an input device include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, a biometric sensor, etc., or any combination thereof. An output device may use the same type of interface port as an input device. For example, a Universal Serial Bus (USB) port may be used to provide an input device and an output device.

In some embodiments, the power source 1208 is structured as a battery or battery pack. Other types of power sources, such as an external power source (e.g., an electricity outlet), photovoltaic device, or power cell, may be used. The power source 1208 may further include power circuitry for delivering power from the power source 1208 itself, and/or an external power source, to the various parts of the UE 1200 via input circuitry or an interface such as an electrical power cable. Delivering power may be, for example, for charging of the power source 1208. Power circuitry may perform any formatting, converting, or other modification to the power from the power source 1208 to make the power suitable for the respective components of the UE 1200 to which power is supplied.

The memory 1210 may be or be configured to include memory such as random access memory (RAM), read-only memory (ROM), programmable read-only memory (PROM), erasable programmable read-only memory (EPROM), electrically erasable programmable read-only memory (EEPROM), magnetic disks, optical disks, hard disks, removable cartridges, flash drives, and so forth. In one example, the memory 1210 includes one or more application programs 1214, such as an operating system, web browser application, a widget, gadget engine, or other application, and corresponding data 1216. The memory 1210 may store, for use by the UE 1200, any of a variety of various operating systems or combinations of operating systems.

The memory 1210 may be configured to include a number of physical drive units, such as redundant array of independent disks (RAID), flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as tamper resistant module in the form of a universal integrated circuit card (UICC) including one or more subscriber identity modules (SIMs), such as a USIM and/or ISIM, other memory, or any combination thereof. The UICC may for example be an embedded UICC (eUICC), integrated UICC (iUICC) or a removable UICC commonly known as 'SIM card.' The memory 1210 may allow the UE 1200 to access instructions, application programs and the like, stored on transitory or non-transitory memory media, to off-load data, or to upload data. An article of manufacture, such as one utilizing a communication system may be tangibly embodied as or in the memory 1210, which may be or comprise a device-readable storage medium.

The processing circuitry 1202 may be configured to communicate with an access network or other network using the communication interface 1212. The communication interface 1212 may comprise one or more communication subsystems and may include or be communicatively coupled to an antenna 1222. The communication interface 1212 may include one or more transceivers used to communicate, such as by communicating with one or more remote transceivers of another device capable of wireless communication (e.g., another UE or a network node in an access network). Each transceiver may include a transmitter 1218 and/or a receiver 1220 appropriate to provide network communications (e.g., optical, electrical, frequency allocations, and so forth). Moreover, the transmitter 1218 and receiver 1220 may be coupled to one or more antennas (e.g., antenna 1222) and may share circuit components, software or firmware, or alternatively be implemented separately.

In the illustrated embodiment, communication functions of the communication interface 1212 may include cellular communication, Wi-Fi communication, LPWAN communication, data communication, voice communication, multimedia communication, short-range communications such as Bluetooth, near-field communication, location-based communication such as the use of the global positioning system (GPS) to determine a location, another like communication function, or any combination thereof. Communications may be implemented in according to one or more communication protocols and/or standards, such as IEEE 802.11, Code Division Multiplexing Access (CDMA), Wideband Code Division Multiple Access (WCDMA), GSM, LTE, New Radio (NR), UMTS, WiMax, Ethernet, transmission control protocol/internet protocol (TCP/IP), synchronous optical networking (SONET), Asynchronous Transfer Mode (ATM), QUIC, Hypertext Transfer Protocol (HTTP), and so forth.

Regardless of the type of sensor, a UE may provide an output of data captured by its sensors, through its communication interface 1212, via a wireless connection to a network node. Data captured by sensors of a UE can be communicated through a wireless connection to a network node via another UE. The output may be periodic (e.g., once every 15 minutes if it reports the sensed temperature), random (e.g., to even out the load from reporting from several sensors), in response to a triggering event (e.g., an alert is sent when moisture is detected), in response to a request (e.g., a user initiated request), or a continuous stream (e.g., a live video feed of a patient).

As another example, a UE comprises an actuator, a motor, or a switch, related to a communication interface configured to receive wireless input from a network node via a wireless connection. In response to the received wireless input the states of the actuator, the motor, or the switch may change. For example, the UE may comprise a motor that adjusts the control surfaces or rotors of a drone in flight according to the received input or to a robotic arm performing a medical procedure according to the received input.

A UE, when in the form of an Internet of Things (IoT) device, may be a device for use in one or more application domains, these domains comprising, but not limited to, city wearable technology, extended industrial application and healthcare. Non-limiting examples of such an IoT device are a device which is or which is embedded in: a connected refrigerator or freezer, a TV, a connected lighting device, an electricity meter, a robot vacuum cleaner, a voice controlled smart speaker, a home security camera, a motion detector, a thermostat, a smoke detector, a door/window sensor, a flood/moisture sensor, an electrical door lock, a connected doorbell, an air conditioning system like a heat pump, an autonomous vehicle, a surveillance system, a weather monitoring device, a vehicle parking monitoring device, an electric vehicle charging station, a smart watch, a fitness tracker, a head-mounted display for Augmented Reality (AR) or Virtual Reality (VR), a wearable for tactile augmentation or sensory enhancement, a water sprinkler, an animal- or item-tracking device, a sensor for monitoring a plant or animal, an industrial robot, an Unmanned Aerial Vehicle (UAV), and any kind of medical device, like a heart rate monitor or a remote controlled surgical robot. A UE in the form of an IoT device comprises circuitry and/or software in dependence of the intended application of the IoT device in addition to other components as described in relation to the UE 1200 shown in FIG. 12.

As yet another specific example, in an IoT scenario, a UE may represent a machine or other device that performs monitoring and/or measurements and transmits the results of such monitoring and/or measurements to another UE and/or a network node. The UE may in this case be an M2M device, which may in a 3GPP context be referred to as an MTC device. As one particular example, the UE may implement the 3GPP NB-IoT standard. In other scenarios, a UE may represent a vehicle, such as a car, a bus, a truck, a ship and an airplane, or other equipment that is capable of monitoring and/or reporting on its operational status or other functions associated with its operation.

In practice, any number of UEs may be used together with respect to a single use case. For example, a first UE might be or be integrated in a drone and provide the drone's speed information (obtained through a speed sensor) to a second UE that is a remote controller operating the drone. When the user makes changes from the remote controller, the first UE may adjust the throttle on the drone (e.g., by controlling an actuator) to increase or decrease the drone's speed. The first and/or the second UE can also include more than one of the functionalities described above. For example, a UE might comprise the sensor and the actuator, and handle communication of data for both the speed sensor and the actuators.

Figure 13:
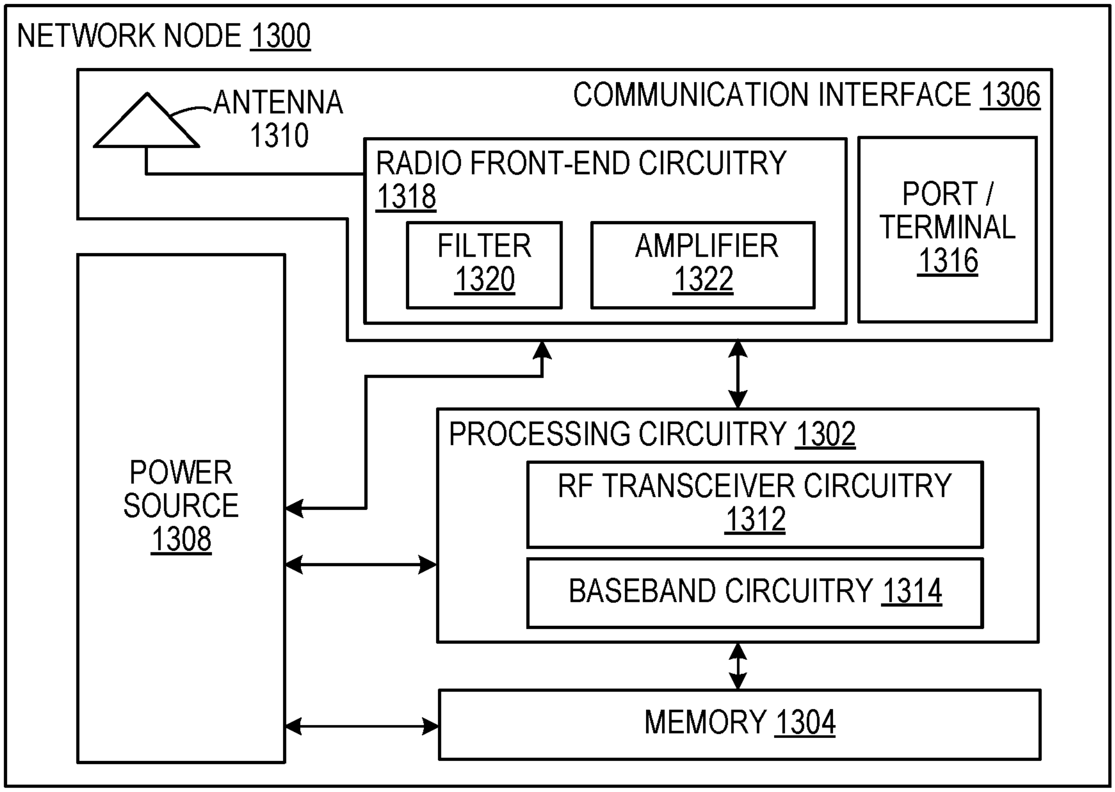
FIG. 13 shows a network node according to various embodiments of the present disclosure.

FIG. 13 shows a network node 1300 in accordance with some embodiments. As used herein, network node refers to equipment capable, configured, arranged and/or operable to communicate directly or indirectly with a UE and/or with other network nodes or equipment, in a telecommunication network. Examples of network nodes include, but are not limited to, access points (APs) (e.g., radio access points), base stations (BSs) (e.g., radio base stations, Node Bs, evolved Node Bs (eNBs) and NR NodeBs (gNBs)).

Base stations may be categorized based on the amount of coverage they provide (or, stated differently, their transmit power level) and so, depending on the provided amount of coverage, may be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS).

Other examples of network nodes include multiple transmission point (multi-TRP) 5G access nodes, multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), Operation and Maintenance (O&M) nodes, Operations Support System (OSS) nodes, Self-Organizing Network (SON) nodes, positioning nodes (e.g., Evolved Serving Mobile Location Centers (E-SMLCs)), and/or Minimization of Drive Tests (MDTs).

The network node 1300 includes a processing circuitry 1302, a memory 1304, a communication interface 1306, and a power source 1308. The network node 1300 may be composed of multiple physically separate components (e.g., a NodeB component and a RNC component, or a BTS component and a BSC component, etc.), which may each have their own respective components. In certain scenarios in which the network node 1300 comprises multiple separate components (e.g., BTS and BSC components), one or more of the separate components may be shared among several network nodes. For example, a single RNC may control multiple NodeBs. In such a scenario, each unique NodeB and RNC pair, may in some instances be considered a single separate network node. In some embodiments, the network node 1300 may be configured to support multiple radio access technologies (RATs). In such embodiments, some components may be duplicated (e.g., separate memory 1304 for different RATs) and some components may be reused (e.g., a same antenna 1310 may be shared by different RATs). The network node 1300 may also include multiple sets of the various illustrated components for different wireless technologies integrated into network node 1300, for example GSM, WCDMA, LTE, NR, WiFi, Zigbee, Z-wave, LoRaWAN, Radio Frequency Identification (RFID) or Bluetooth wireless technologies. These wireless technologies may be integrated into the same or different chip or set of chips and other components within network node 1300.

The processing circuitry 1302 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 1300 components, such as the memory 1304, to provide network node 1300 functionality.

In some embodiments, the processing circuitry 1302 includes a system on a chip (SOC). In some embodiments, the processing circuitry 1302 includes one or more of radio frequency (RF) transceiver circuitry 1312 and baseband processing circuitry 1314. In some embodiments, the radio frequency (RF) transceiver circuitry 1312 and the baseband processing circuitry 1314 may be on separate chips (or sets of chips), boards, or units, such as radio units and digital units. In alternative embodiments, part or all of RF transceiver circuitry 1312 and baseband processing circuitry 1314 may be on the same chip or set of chips, boards, or units.

The memory 1304 may comprise any form of volatile or non-volatile computer-readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device-readable and/or computer-executable memory devices that store information, data, and/or instructions that may be used by the processing circuitry 1302. The memory 1304 may store any suitable instructions, data, or information, including a computer program, software, an application including one or more of logic, rules, code, tables, and/or other instructions capable of being executed by the processing circuitry 1302 and utilized by the network node 1300. The memory 1304 may be used to store any calculations made by the processing circuitry 1302 and/or any data received via the communication interface 1306. In some embodiments, the processing circuitry 1302 and memory 1304 is integrated.

The communication interface 1306 is used in wired or wireless communication of signaling and/or data between a network node, access network, and/or UE. As illustrated, the communication interface 1306 comprises port(s)/terminal(s) 1316 to send and receive data, for example to and from a network over a wired connection. The communication interface 1306 also includes radio front-end circuitry 1318 that may be coupled to, or in certain embodiments a part of, the antenna 1310. Radio front-end circuitry 1318 comprises filters 1320 and amplifiers 1322. The radio front-end circuitry 1318 may be connected to an antenna 1310 and processing circuitry 1302. The radio front-end circuitry may be configured to condition signals communicated between antenna 1310 and processing circuitry 1302. The radio front-end circuitry 1318 may receive digital data that is to be sent out to other network nodes or UEs via a wireless connection. The radio front-end circuitry 1318 may convert the digital data into a radio signal having the appropriate channel and bandwidth parameters using a combination of filters 1320 and/or amplifiers 1322. The radio signal may then be transmitted via the antenna 1310. Similarly, when receiving data, the antenna 1310 may collect radio signals which are then converted into digital data by the radio front-end circuitry 1318. The digital data may be passed to the processing circuitry 1302. In other embodiments, the communication interface may comprise different components and/or different combinations of components.

In certain alternative embodiments, the network node 1300 does not include separate radio front-end circuitry 1318, instead, the processing circuitry 1302 includes radio front-end circuitry and is connected to the antenna 1310. Similarly, in some embodiments, all or some of the RF transceiver circuitry 1312 is part of the communication interface 1306. In still other embodiments, the communication interface 1306 includes one or more ports or terminals 1316, the radio front-end circuitry 1318, and the RF transceiver circuitry 1312, as part of a radio unit (not shown), and the communication interface 1306 communicates with the baseband processing circuitry 1314, which is part of a digital unit (not shown).

The antenna 1310 may include one or more antennas, or antenna arrays, configured to send and/or receive wireless signals. The antenna 1310 may be coupled to the radio front-end circuitry 1318 and may be any type of antenna capable of transmitting and receiving data and/or signals wirelessly. In certain embodiments, the antenna 1310 is separate from the network node 1300 and connectable to the network node 1300 through an interface or port.

The antenna 1310, communication interface 1306, and/or the processing circuitry 1302 may be configured to perform any receiving operations and/or certain obtaining operations described herein as being performed by the network node. Any information, data and/or signals may be received from a UE, another network node and/or any other network equipment. Similarly, the antenna 1310, the communication interface 1306, and/or the processing circuitry 1302 may be configured to perform any transmitting operations described herein as being performed by the network node. Any information, data and/or signals may be transmitted to a UE, another network node and/or any other network equipment.

The power source 1308 provides power to the various components of network node 1300 in a form suitable for the respective components (e.g., at a voltage and current level needed for each respective component). The power source 1308 may further comprise, or be coupled to, power management circuitry to supply the components of the network node 1300 with power for performing the functionality described herein. For example, the network node 1300 may be connectable to an external power source (e.g., the power grid, an electricity outlet) via an input circuitry or interface such as an electrical cable, whereby the external power source supplies power to power circuitry of the power source 1308. As a further example, the power source 1308 may comprise a source of power in the form of a battery or battery pack which is connected to, or integrated in, power circuitry. The battery may provide backup power should the external power source fail.

Embodiments of the network node 1300 may include additional components beyond those shown in FIG. 13 for providing certain aspects of the network node's functionality, including any of the functionality described herein and/or any functionality necessary to support the subject matter described herein. For example, the network node 1300 may include user interface equipment to allow input of information into the network node 1300 and to allow output of information from the network node 1300. This may allow a user to perform diagnostic, maintenance, repair, and other administrative functions for the network node 1300.

Figure 14:
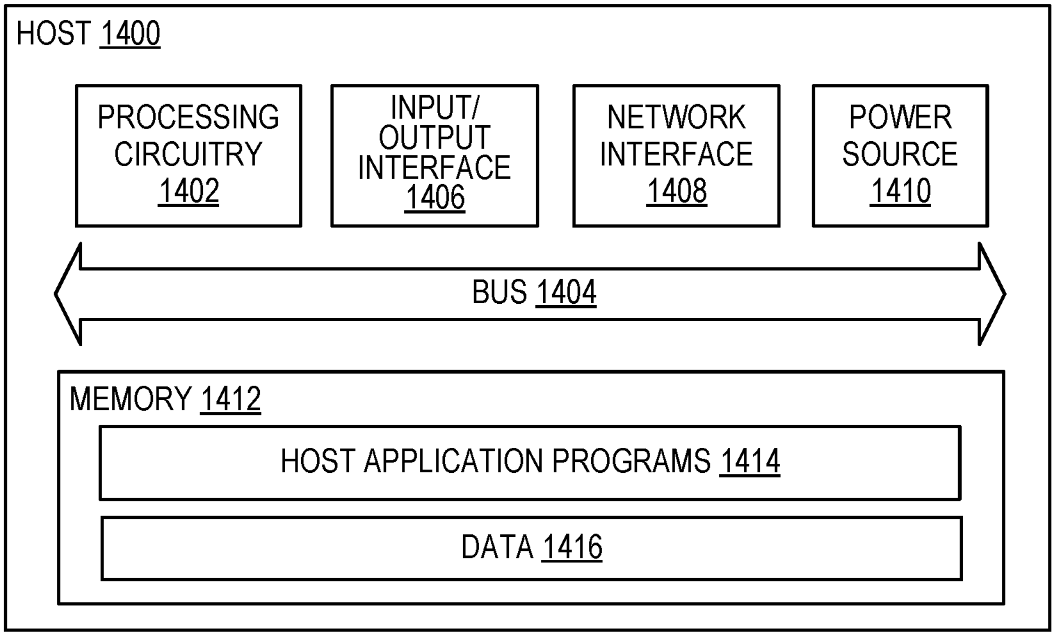
FIG. 14 shows host computing system according to various embodiments of the present disclosure.

FIG. 14 is a block diagram of a host 1400, which may be an embodiment of the host 1116 of FIG. 11, in accordance with various aspects described herein. As used herein, the host 1400 may be or comprise various combinations hardware and/or software, including a standalone server, a blade server, a cloud-implemented server, a distributed server, a virtual machine, container, or processing resources in a server farm. The host 1400 may provide one or more services to one or more UEs.

The host 1400 includes processing circuitry 1402 that is operatively coupled via a bus 1404 to an input/output interface 1406, a network interface 1408, a power source 1410, and a memory 1412. Other components may be included in other embodiments. Features of these components may be substantially similar to those described with respect to the devices of previous figures, such as FIGS. 12 and 13, such that the descriptions thereof are generally applicable to the corresponding components of host 1400.

The memory 1412 may include one or more computer programs including one or more host application programs 1414 and data 1416, which may include user data, e.g., data generated by a UE for the host 1400, or data generated by the host 1400 for a UE. Embodiments of the host 1400 may utilize all or various subsets of the components shown. The host application programs 1414 may be implemented in a container-based architecture and may provide support for video codecs (e.g., Versatile Video Coding (VVC), High Efficiency Video Coding (HEVC), Advanced Video Coding (AVC), MPEG, VP9) and audio codecs (e.g., FLAC, Advanced Audio Coding (AAC), MPEG, G.711), including transcoding for multiple different classes, types, or implementations of UEs (e.g., handsets, desktop computers, wearable display systems, heads-up display systems). The host application programs 1414 may also provide for user authentication and licensing checks and may periodically report health, routes, and content availability to a central node, such as a device in or on the edge of a core network. Accordingly, the host 1400 may select and/or indicate a different host for over-the-top services for a UE. The host application programs 1414 may support various protocols, such as the HTTP Live Streaming (HLS) protocol, Real-Time Messaging Protocol (RTMP), Real-Time Streaming Protocol (RTSP), Dynamic Adaptive Streaming over HTTP (MPEG-DASH), etc.

Figure 15:
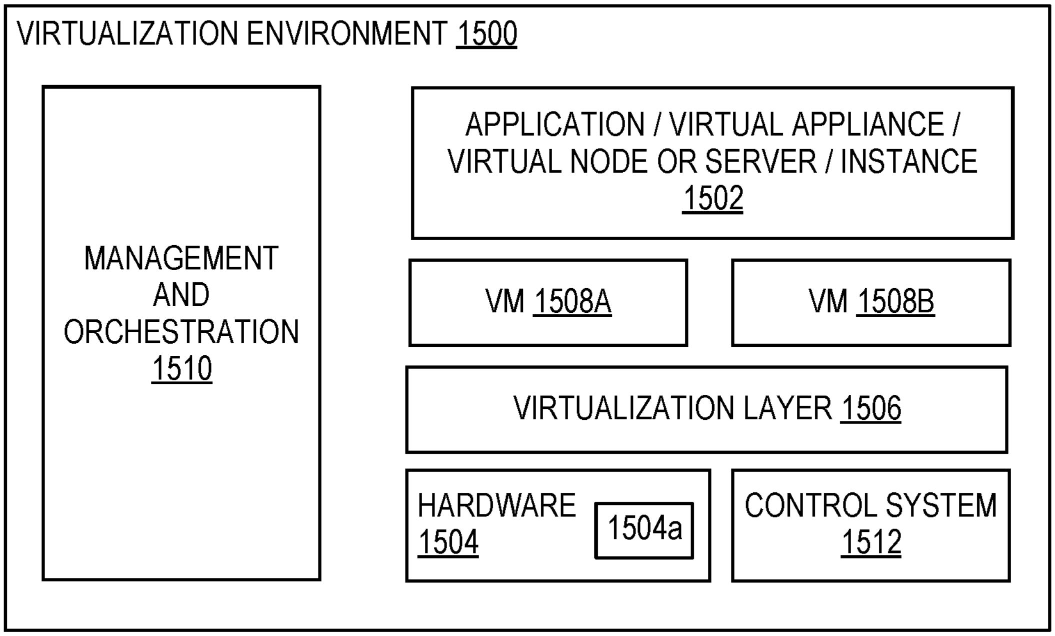
FIG. 15 is a block diagram of a virtualization environment in functions implemented by some embodiments of the present disclosure may be virtualized.

FIG. 15 is a block diagram illustrating a virtualization environment 1500 in which functions implemented by some embodiments may be virtualized. In the present context, virtualizing means creating virtual versions of apparatuses or devices which may include virtualizing hardware platforms, storage devices and networking resources. As used herein, virtualization can be applied to any device described herein, or components thereof, and relates to an implementation in which at least a portion of the functionality is implemented as one or more virtual components. Some or all of the functions described herein may be implemented as virtual components executed by one or more virtual machines (VMs) implemented in one or more virtual environments 1500 hosted by one or more of hardware nodes, such as a hardware computing device that operates as a network node, UE, core network node, or host. Further, in embodiments in which the virtual node does not require radio connectivity (e.g., a core network node or host), then the node may be entirely virtualized.

Applications 1502 (which may alternatively be called software instances, virtual appliances, network functions, virtual nodes, virtual network functions, etc.) are run in the virtualization environment Q400 to implement some of the features, functions, and/or benefits of some of the embodiments disclosed herein.

Hardware 1504 includes processing circuitry, memory that stores software and/or instructions executable by hardware processing circuitry, and/or other hardware devices as described herein, such as a network interface, input/output interface, and so forth. Software may be executed by the processing circuitry to instantiate one or more virtualization layers 1506 (also referred to as hypervisors or virtual machine monitors (VMMs)), provide VMs 1508*a* and 1508*b* (one or more of which may be generally referred to as VMs 1508), and/or perform any of the functions, features and/or benefits described in relation with some embodiments described herein. The virtualization layer 1506 may present a virtual operating platform that appears like networking hardware to the VMs 1508.

The VMs 1508 comprise virtual processing, virtual memory, virtual networking or interface and virtual storage, and may be run by a corresponding virtualization layer 1506. Different embodiments of the instance of a virtual appliance 1502 may be implemented on one or more of VMs 1508, and the implementations may be made in different ways. Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, a VM 1508 may be a software implementation of a physical machine that runs programs as if they were executing on a physical, non-virtualized machine. Each of the VMs 1508, and that part of hardware 1504 that executes that VM, be it hardware dedicated to that VM and/or hardware shared by that VM with others of the VMs, forms separate virtual network elements. Still in the context of NFV, a virtual network function is responsible for handling specific network functions that run in one or more VMs 1508 on top of the hardware 1504 and corresponds to the application 1502.

Hardware 1504 may be implemented in a standalone network node with generic or specific components. Hardware 1504 may implement some functions via virtualization. Alternatively, hardware 1504 may be part of a larger cluster of hardware (e.g., such as in a data center or CPE) where many hardware nodes work together and are managed via management and orchestration 1510, which, among others, oversees lifecycle management of applications 1502. In some embodiments, hardware 1504 is coupled to one or more radio units that each include one or more transmitters and one or more receivers that may be coupled to one or more antennas. Radio units may communicate directly with other hardware nodes via one or more appropriate network interfaces and may be used in combination with the virtual components to provide a virtual node with radio capabilities, such as a radio access node or a base station. In some embodiments, some signaling can be provided with the use of a control system 1512 which may alternatively be used for communication between hardware nodes and radio units.

Figure 16:
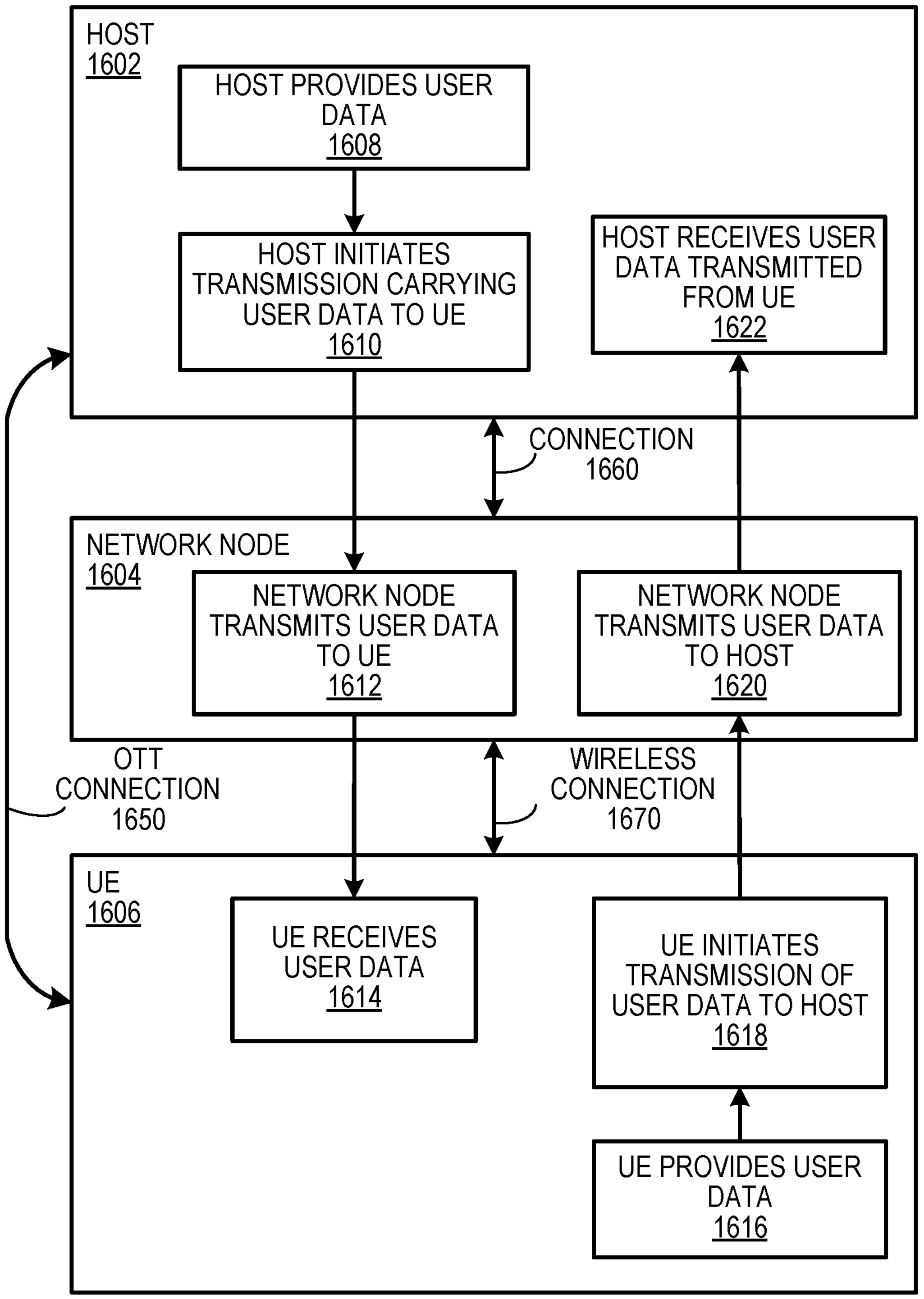
FIG. 16 illustrates communication between a host computing system, a network node, and a UE via multiple connections, at least one of which is wireless, according to various embodiments of the present disclosure.

FIG. 16 shows a communication diagram of a host 1602 communicating via a network node 1604 with a UE 1606 over a partially wireless connection in accordance with some embodiments. Example implementations, in accordance with various embodiments, of the UE (such as a UE 1112*a* of FIG. 11 and/or UE 1200 of FIG. 12), network node (such as network node 1110*a* of FIG. 11 and/or network node 1300 of FIG. 13), and host (such as host 1116 of FIG. 11 and/or host 1400 of FIG. 14) discussed in the preceding paragraphs will now be described with reference to FIG. 16.

Like host 1400, embodiments of host 1602 include hardware, such as a communication interface, processing circuitry, and memory. The host 1602 also includes software, which is stored in or accessible by the host 1602 and executable by the processing circuitry. The software includes a host application that may be operable to provide a service to a remote user, such as the UE 1606 connecting via an over-the-top (OTT) connection 1650 extending between the UE 1606 and host 1602. In providing the service to the remote user, a host application may provide user data which is transmitted using the OTT connection 1650.

The network node 1604 includes hardware enabling it to communicate with the host 1602 and UE 1606. The connection 1660 may be direct or pass through a core network (like core network 1106 of FIG. 11) and/or one or more other intermediate networks, such as one or more public, private, or hosted networks. For example, an intermediate network may be a backbone network or the Internet.

The UE 1606 includes hardware and software, which is stored in or accessible by UE 1606 and executable by the UE's processing circuitry. The software includes a client application, such as a web browser or operator-specific "app" that may be operable to provide a service to a human or non-human user via UE 1606 with the support of the host 1602. In the host 1602, an executing host application may communicate with the executing client application via the OTT connection 1650 terminating at the UE 1606 and host 1602. In providing the service to the user, the UE's client application may receive request data from the host's host application and provide user data in response to the request data. The OTT connection 1650 may transfer both the request data and the user data. The UE's client application may interact with the user to generate the user data that it provides to the host application through the OTT connection 1650.

The OTT connection 1650 may extend via a connection 1660 between the host 1602 and the network node 1604 and via a wireless connection 1670 between the network node 1604 and the UE 1606 to provide the connection between the host 1602 and the UE 1606. The connection 1660 and wireless connection 1670, over which the OTT connection 1650 may be provided, have been drawn abstractly to illustrate the communication between the host 1602 and the UE 1606 via the network node 1604, without explicit reference to any intermediary devices and the precise routing of messages via these devices.

As an example of transmitting data via the OTT connection 1650, in step 1608, the host 1602 provides user data, which may be performed by executing a host application. In some embodiments, the user data is associated with a particular human user interacting with the UE 1606. In other embodiments, the user data is associated with a UE 1606 that shares data with the host 1602 without explicit human interaction. In step 1610, the host 1602 initiates a transmission carrying the user data towards the UE 1606. The host 1602 may initiate the transmission responsive to a request transmitted by the UE 1606. The request may be caused by human interaction with the UE 1606 or by operation of the client application executing on the UE 1606. The transmission may pass via the network node 1604, in accordance with the teachings of the embodiments described throughout this disclosure. Accordingly, in step 1612, the network node 1604 transmits to the UE 1606 the user data that was carried in the transmission that the host 1602 initiated, in accordance with the teachings of the embodiments described throughout this disclosure. In step 1614, the UE 1606 receives the user data carried in the transmission, which may be performed by a client application executed on the UE 1606 associated with the host application executed by the host 1602.

In some examples, the UE 1606 executes a client application which provides user data to the host 1602. The user data may be provided in reaction or response to the data received from the host 1602. Accordingly, in step 1616, the UE 1606 may provide user data, which may be performed by executing the client application. In providing the user data, the client application may further consider user input received from the user via an input/output interface of the UE 1606. Regardless of the specific manner in which the user data was provided, the UE 1606 initiates, in step 1618, transmission of the user data towards the host 1602 via the network node 1604. In step 1620, in accordance with the teachings of the embodiments described throughout this disclosure, the network node 1604 receives user data from the UE 1606 and initiates transmission of the received user data towards the host 1602. In step 1622, the host 1602 receives the user data carried in the transmission initiated by the UE 1606.

One or more of the various embodiments improve the performance of OTT services provided to the UE 1606 using the OTT connection 1650, in which the wireless connection 1670 forms the last segment. More precisely, the teachings of these embodiments enable a UE to provide feedback on actual UE energy consumption, energy efficiency (EE), and/or QoS impact, for one or more configurations provided by a network node. Embodiments facilitate improved network discovery of configurations that will provide reduced UE energy consumption for a particular QoS requirement, for all UEs that share at least some common characteristics and/or conditions (e.g., manufacturer, chipset, software, RF architecture, radio conditions, cell traffic conditions, etc.). For example, by using machine learning (ML)-based techniques, the network can adapt to specific characteristics of UEs as well as to different feedback metrics provided by different UEs. Moreover, UEs are incentivized to provide accurate feedback metrics since doing so helps train the ML-model used to generate improved configurations for all UEs have the shared characteristic(s) and/or condition(s).

These improvements can increase the value of OTT services to end users and service providers through increased UE battery life as well as better reliability, less latency, and/or better QoS/quality of experience (QoE) for OTT services.

In an example scenario, factory status information may be collected and analyzed by the host 1602. As another example, the host 1602 may process audio and video data which may have been retrieved from a UE for use in creating maps. As another example, the host 1602 may collect and analyze real-time data to assist in controlling vehicle congestion (e.g., controlling traffic lights). As another example, the host 1602 may store surveillance video uploaded by a UE. As another example, the host 1602 may store or control access to media content such as video, audio, VR or AR which it can broadcast, multicast or unicast to UEs. As other examples, the host 1602 may be used for energy pricing, remote control of non-time critical electrical load to balance power generation needs, location services, presentation services (such as compiling diagrams etc. from data collected from remote devices), or any other function of collecting, retrieving, storing, analyzing and/or transmitting data.

In some examples, a measurement procedure may be provided for the purpose of monitoring data rate, latency and other factors on which the one or more embodiments improve. There may further be an optional network functionality for reconfiguring the OTT connection 1650 between the host 1602 and UE 1606, in response to variations in the measurement results. The measurement procedure and/or the network functionality for reconfiguring the OTT connection may be implemented in software and hardware of the host 1602 and/or UE 1606. In some embodiments, sensors (not shown) may be deployed in or in association with other devices through which the OTT connection 1650 passes; the sensors may participate in the measurement procedure by supplying values of the monitored quantities exemplified above or supplying values of other physical quantities from which software may compute or estimate the monitored quantities. The reconfiguring of the OTT connection 1650 may include message format, retransmission settings, preferred routing etc.; the reconfiguring need not directly alter the operation of the network node 1604. Such procedures and functionalities may be known and practiced in the art. In certain embodiments, measurements may involve proprietary UE signaling that facilitates measurements of throughput, propagation times, latency and the like, by the host 1602. The measurements may be implemented in that software causes messages to be transmitted, in particular empty or 'dummy' messages, using the OTT connection 1650 while monitoring propagation times, errors, etc.

The foregoing merely illustrates the principles of the disclosure. Various modifications and alterations to the described embodiments will be apparent to those skilled in the art in view of the teachings herein. It will thus be appreciated that those skilled in the art will be able to devise numerous systems, arrangements, and procedures that, although not explicitly shown or described herein, embody the principles of the disclosure and can be thus within the spirit and scope of the disclosure. Various embodiments can be used together with one another, as well as interchangeably therewith, as should be understood by those having ordinary skill in the art.

The term unit, as used herein, can have conventional meaning in the field of electronics, electrical devices and/or electronic devices and can include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include Digital Signal Processor (DSPs), special-purpose digital logic, and the like. The processing circuitry may be configured to execute program code stored in memory, which may include one or several types of memory such as Read Only Memory (ROM), Random Access Memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

As described herein, device and/or apparatus can be represented by a semiconductor chip, a chipset, or a (hardware) module comprising such chip or chipset; this, however, does not exclude the possibility that a functionality of a device or apparatus, instead of being hardware implemented, be implemented as a software module such as a computer program or a computer program product comprising executable software code portions for execution or being run on a processor. Furthermore, functionality of a device or apparatus can be implemented by any combination of hardware and software. A device or apparatus can also be regarded as an assembly of multiple devices and/or apparatuses, whether functionally in cooperation with or independently of each other. Moreover, devices and apparatuses can be implemented in a distributed fashion throughout a system, so long as the functionality of the device or apparatus is preserved. Such and similar principles are considered as known to a skilled person.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

In addition, certain terms used in the present disclosure, including the specification and drawings, can be used synonymously in certain instances (e.g., "data" and "information"). It should be understood, that although these terms (and/or other terms that can be synonymous to one another) can be used synonymously herein, there can be instances when such words can be intended to not be used synonymously. Further, to the extent that the prior art knowledge has not been explicitly incorporated by reference herein above, it is explicitly incorporated herein in its entirety. All publications referenced are incorporated herein by reference in their entireties.

Embodiments of the techniques and apparatus described herein also include, but are not limited to, the following enumerated examples:

A1. A method for a user equipment (UE) operating in a cell of the wireless network, the method comprising:
- receiving, from a network node, one or more configurations for UE operation in the cell;
- determining one or more of the following information associated with at least the received configurations and UE data traffic: UE energy efficiency (EE), and quality-of-service (QoS); and
- sending, to the network node, the determined information or one or more indications thereof.

A2. The method of embodiment A1, wherein each configuration includes settings or values for one or more of the following:
- discontinuous reception (DRX) while the UE is operating in a connected state;
- DRX while the UE is operating in a non-connected state;
- wake-up signals (WUS) while the UE is operating in a non-connected state;
- measurement or monitoring of beams and/or reference signals transmitted by the network node;
- carrier aggregation (CA);
- dual connectivity (DC);
- bandwidth parts (BWP);
- multi-input multi-output (MIMO) reception and/or transmission;
- physical downlink control channel (PDCCH) monitoring; and
- quality-of-service (QoS).

A3. The method of any of embodiments A1-A2, wherein determining the UE EE information associated with each of the received configurations comprises determining one of the following for one of the configurations being used by the UE for operating in the cell:
- an actual UE energy consumption based on operating current measurements during an observation period; or
- an estimated UE energy consumption based on:
  - durations spent by the UE in each of a plurality of operating states during the observation period, and
  - a model for UE energy consumption in each of the plurality of operating states.

A4. The method of any of embodiments A1-A3, wherein determining the UE EE information associated with each of the received configurations comprises determining an estimated UE energy consumption for a configuration not being used by the UE based on one or more of the following:
- a database storing energy consumption information for at least one of a manufacturer, a model number, and a chipset associated with the UE;
- actual UE energy consumption during previous operation in the configuration or in a configuration similar to the configuration; and
- estimated durations spent by the UE in each of a plurality of operating states and a model for UE energy consumption in each of the plurality of operating states.

A5. The method of any of embodiments A3-A4, wherein determining the UE EE information associated with each of the received configurations further comprises adjusting actual or estimated UE energy consumption by removing energy consumption that is independent of the one or more configurations.

A6. The method of any of embodiments A1-A5, wherein
- each of the configurations include a QoS identifier associated with one or more QoS characteristics; and
- the UE determines and sends UE EE information only for the configurations having a QoS identifier and/or QoS characteristics that correspond to at least one of the following: an established data radio bearer (DRB) for the UE, and data traffic of one or more UE applications.

A7. The method of any of embodiments A1-A5, wherein the determined information or one or more indications thereof sent to the network node includes one or more of the following:
- respective absolute EE ratings for the received configurations;
- one absolute EE rating for a received configuration that is being used by the UE;
- respective EE ratings of the received configurations relative to a reference EE rating;
- respective EE differences between the received configurations and a configuration being used by the UE;
- an EE difference between two of the received configurations;
- actual or estimated absolute UE energy consumption for the received configurations; and
- actual or estimated UE energy consumption for the received configurations, relative to a reference UE energy consumption.

A8. The method of embodiment A7, wherein:
- each received configuration includes a corresponding reference EE rating;
- each reference EE rating includes an estimated range of absolute EE ratings for the corresponding configuration; and
- the indications sent to the network node comprise indications of whether actual EE ratings of the receive configurations are within the respective estimated ranges of absolute EE ratings.

A9. The method of embodiment A7, wherein the reference UE energy consumption is one of the following:
actual UE energy consumption when operating in a non-connected state; or
actual or estimated UE energy consumption when operating in a reference configuration.

A10. The method of any of embodiments A7-A9, wherein the determined information or one or more indications thereof sent to the network node also includes one or more of the following:
respective absolute QoS ratings for the received configurations;
one absolute QoS rating for a received configuration that is being used by the UE;
respective QoS differences between the received configurations and a configuration being used by the UE; and
a QoS difference between two of the received configurations.

A11. The method of embodiment A10, wherein the absolute EE rating and the absolute QoS rating associated with the same received configuration are represented by a combined EE/QoS rating.

A12. The method of any of embodiments A1-A5, wherein:
the received configurations include a plurality of configurations previously used by the UE for data traffic patterns corresponding to the UE data traffic; and
the determined information or one or more indications thereof sent to the network node include an indication of one of the following:
a UE-preferred one of the previously-used configurations, or
an order of UE preference of the previously-used configurations.

A13. The method of any of embodiments A1-A12, wherein the UE EE and/or QoS is determined based on UE data traffic during a single observation period or during each of a plurality of non-overlapping measurement periods comprising the single observation period.

A14. The method of any of embodiments A1-A13, wherein the determined information or one or more indications thereof sent to the network node include an indication of a UE-preferred configuration not included in the received configurations and one or more of the following:
UE EE and/or QoS information associated with the UE-preferred configuration; and
an indication of one or more criteria for selecting the UE-preferred configuration.

A15. The method of embodiment A14, wherein the UE-preferred configuration is associated with one of the following:
change in one or more services for the UE;
change in mapping between QoS flows and data radio bearers (DRBs) for the UE;
change in mapping between network slices and services for the UE;
UE mobility operation;
UE roaming between public land mobile networks (PLMNs);
UE roaming between a PLMN and a private network; or
reconfiguration of UE quality-of-experience (QoE) measurements.

A16. The method of embodiment A14, wherein the indication of the one or more criteria indicates UE prioritization of one of the following:
QoS for the UE data traffic; or
EE due to remaining energy in the UE's battery.

A16a. The method of embodiment A16, further comprising receiving, from the network node, a further configuration for UE operation in the cell, wherein the further configuration provides an increased EE or an increased QoS, relative to the UE's current configuration, based on whether the indication indicates UE prioritization of QoS or EE, respectively.

A16b. The method of embodiment A16a, wherein one or more of the following applies:
the further configuration is different than the UE-preferred configuration; and
the UE-preferred configuration is not supported in the cell.

A16c. The method of any of embodiments A1-A16, further comprising receiving, from the network node, a further configuration for UE operation in the cell, wherein one or more of the following applies:
the further configuration includes at least one signaling radio bearer (SRB) or data radio bearer (DRB) not currently configured for the UE; and
the further configuration excludes at least one SRB or DRB currently configured for the UE.

A17. The method of any of embodiments A1-A16, wherein the one or more configurations are received as one of the following:
system information (SI) broadcast in the cell;
at least one unicast or dedicated radio resource control (RRC) message;
at least one medium access control (MAC) control element (CE); or
at least one downlink control information (DCI) message.

A18. The method of any of embodiments A1-A17, wherein the determined information or one or more indications thereof are sent to the network node as one of the following:
at least one unicast or dedicated radio resource control (RRC) message;
at least one medium access control (MAC) control element (CE); or
at least one downlink control information (DCI) message.

A19. The method of any of embodiments A1-A18, wherein the determined information or one or more indications thereof are sent to the network node responsive to one or more of the following:
receiving the configurations;
a change in the UE data traffic;
UE activation or deactivation of applications;
UE change between a connected state and a non-connected state;
UE mobility operation;
change in one or more of the following used by the UE: network slice, QoS flow, data radio bearer (DRB), signaling radio bearer (SRB), and quality of experience (QoE) measurement configuration;
actual or estimated UE energy consumption for a configuration used by the UE is greater than a first threshold;
QoS for a configuration used by the UE is less than a second threshold; and a network-configured periodic or semi-statistical schedule.

A20. The method of any of embodiments A1-A19, further comprising sending, to the network node, one or more of the following:

an indication of the UE's feedback capabilities for configurations provided by the network; and dynamic information associated with the UE's current conditions.

B1. A method for a network node serving a cell in a wireless network, the method comprising:

sending, to a user equipment (UE), one or more configurations for UE operation in the cell;

receiving, from the UE, UE energy efficiency (EE) information and/or quality-of-service (QoS) information associated with at least the configurations and with UE data traffic; and determining a further configuration for UE operation in the cell based on the received information and based on one or more of the following additional information:

configuration of the cell;

statistics associated with operation of the cell;

current traffic conditions in the cell; and capabilities, status, and/or configuration of at least the UE.

B2. The method of embodiment B1, wherein each configuration includes settings or values for one or more of the following:

discontinuous reception (DRX) while the UE is operating in a connected state;

DRX while the UE is operating in a non-connected state;

wake-up signals (WUS) while the UE is operating in a non-connected state;

measurement or monitoring of beams and/or reference signals transmitted by the network node;

carrier aggregation (CA);

dual connectivity (DC);

bandwidth parts (BWP);

multi-input multi-output (MIMO) reception and/or transmission;

physical downlink control channel (PDCCH) monitoring; and quality-of-service (QoS).

B3. The method of any of embodiments B1-B2, wherein the configuration of the cell includes one or more of the following parameters: cell size, carrier frequency, bandwidth, multi-user multi-input multi-output (MU-MIMO) capabilities.

B4. The method of any of embodiments B1-B3, wherein the statistics associated with operation of the cell are based on one or more of the following parameters: block error rate (BLER), modulation and coding scheme (MCS), power control outer loop adjustments, data throughput, signal to interference and noise (SINR), and traffic load.

B5. The method of any of embodiments B1-B4, wherein the current traffic conditions in the cell are represented by one or more of the following parameters: traffic load during a most recent duration, number of UEs in a connected state during the most recent duration, signal quality measured by UEs during the most recent duration, number of mobility operations by UEs during the most recent duration, and number and/or type of radio bearers currently established for UEs.

B6. The method of any of embodiments B1-B5, wherein the capabilities, status, and/or configuration of at least the UE include any of the following: UE antenna configuration, UE energy source, UE manufacturer and/or model, UE chipset manufacturer and/or model, UE software version, UE class, UE performance category, and UE support for one or more transmission modes used in the cell.

B7. The method of any of embodiments B1-B6, wherein each of the configurations include a QoS identifier associated with one or more QoS characteristics; and the UE EE information and/or QoS information is received only for the configurations having a QoS identifier and/or QoS characteristics that correspond to at least one of the following: an established data radio bearer (DRB) for the UE, and data traffic of one or more UE applications.

B8. The method of any of embodiments B1-B6, wherein the received UE EE information and/or QoS information includes one or more of the following:

respective absolute EE ratings for the received configurations;

one absolute EE rating for a received configuration that is being used by the UE;

respective EE ratings of the received configurations relative to a reference EE rating;

respective EE differences between the received configurations and a configuration being used by the UE;

an EE difference between two of the received configurations;

actual or estimated absolute UE energy consumption for the received configurations; and actual or estimated UE energy consumption for the received configurations, relative to a reference UE energy consumption.

B9. The method of embodiment B8, wherein:

each configuration includes a corresponding reference EE rating;

each reference EE rating includes an estimated range of absolute EE ratings for the corresponding configuration; and the received UE EE information and/or QoS information includes indications of whether actual EE ratings of the receive configurations are within the respective estimated ranges of absolute EE ratings.

B10. The method of embodiment B8, wherein the reference UE energy consumption is one of the following:

actual UE energy consumption when operating in a non-connected state; or actual or estimated UE energy consumption when operating in a reference configuration.

B11. The method of any of embodiments B8-B10, wherein the received UE EE information and/or QoS information also includes one or more of the following:

respective absolute QoS ratings for the received configurations;

one absolute QoS rating for a received configuration that is being used by the UE;

respective QoS differences between the received configurations and a configuration being used by the UE; and a QoS difference between two of the received configurations.

B12. The method of embodiment B11, wherein the absolute EE rating and the absolute QoS rating associated with the same configuration are represented by a combined EE/QoS rating.

B13. The method of any of embodiments B1-B6, wherein:
the configurations include a plurality of configurations previously used by the UE for data traffic patterns corresponding to the UE data traffic; and
the received UE EE information and/or QoS information includes an indication of one of the following:
a UE-preferred one of the previously-used configurations, or
an order of UE preference of the previously-used configurations.

B14. The method of any of embodiments B1-B13, wherein the UE EE and/or QoS information comprises one of the following:
a single set of UE EE and/or QoS information associated with a single observation period, or
a plurality of sets of UE EE and/or QoS information associated with a corresponding plurality of non-overlapping measurement periods comprising the single observation period.

B14a. The method of embodiment B14, wherein determining the further configuration for UE operation in the cell comprises correlating the plurality of sets of UE EE and/or QoS information with a corresponding plurality of sets of the additional information associated with the respective measurement periods.

B15. The method of any of embodiments B1-B14, wherein the received UE EE information and/or QoS information includes an indication of a UE-preferred configuration not included in the configurations and one or more of the following:
UE EE and/or QoS information associated with the UE-preferred configuration; and
an indication of one or more criteria for selecting the UE-preferred configuration.

B16. The method of embodiment B15, wherein the UE-preferred configuration is associated with one of the following:
change in one or more services for the UE;
change in mapping between QoS flows and data radio bearers (DRBs) for the UE;
change in mapping between network slices and services for the UE;
UE mobility operation;
UE roaming between public land mobile networks (PLMNs);
UE roaming between a PLMN and a private network; or
reconfiguration of UE quality-of-experience (QoE) measurements.

B17. The method of embodiment B15, wherein the indication of the one or more criteria indicates UE prioritization of one of the following:
QoS for the UE data traffic; or
EE due to remaining energy in the UE's battery.

B17a. The method of embodiment B17, wherein:
the further configuration is for the UE; and
the further configuration provides an increased EE or an increased QoS, relative to the UE's current configuration, based on whether the indication indicates UE prioritization of QoS or EE, respectively.

B17b. The method of embodiment B17a, wherein one or more of the following applies:
the further configuration is different than the UE-preferred configuration; and
the UE-preferred configuration is not supported in the cell.

B18. The method of any of embodiments B1-B17b, wherein the further configuration is for the UE and one or more of the following applies:
the further configuration includes at least one signaling radio bearer (SRB) or data radio bearer (DRB) not currently configured for the UE; and
the further configuration excludes at least one SRB or DRB currently configured for the UE.

B19. The method of any of embodiments B1-B17, wherein:
the method further comprises:
sending the one or more configurations to one or more further UEs; and
receiving, from the further UEs, respective further UE EE information and/or QoS information associated with at least the configurations and with further UE data traffic; and
determining the further configuration for UE operation in the cell comprises applying a reinforcement learning (RL) algorithm to the received information, the received further information, and the additional information.

B20. The method of embodiment B19, wherein the further configuration is for one of the following:
all UEs operating in the cell,
all UEs served by a particular network slice, or
all UEs associated with a particular QoS profile.

B21. The method of any of embodiments B1-B20, wherein the one or more configurations are sent as one of the following:
system information (SI) broadcast in the cell;
at least one unicast or dedicated radio resource control (RRC) message;
at least one medium access control (MAC) control element (CE); or
at least one downlink control information (DCI) message.

B22. The method of any of embodiments B1-B21, wherein the UE EE information and/or QoS information are received as one of the following:
at least one unicast or dedicated radio resource control (RRC) message;
at least one medium access control (MAC) control element (CE); or
at least one downlink control information (DCI) message.

B23. The method of any of embodiments B1-B22, wherein the UE EE information and/or QoS information are received in response to one or more of the following:
sending the one or more configurations;
a change in the UE data traffic;
UE activation or deactivation of applications;
UE change between a connected state and a non-connected state;
UE mobility operation;
change in one or more of the following used by the UE: network slice, QoS flow, data radio bearer (DRB), signaling radio bearer (SRB), and quality of experience (QoE) measurement configuration;
actual or estimated UE energy consumption for a configuration used by the UE is greater than a first threshold;
QoS for a configuration used by the UE is less than a second threshold; and
a network-configured periodic or semi-statistical schedule.

B24. The method of any of embodiments B1-B22, further comprising configuring one or more further UEs for operation in the cell according to the determined further configuration.

B25. The method of embodiment B1-B23, further comprising configuring the UE for operation in the cell according to the determined further configuration.

B26. The method of any of embodiments B1-B25, further comprising receiving, from the UE, one or more of the following information:
- an indication of the UE's feedback capabilities for configurations provided by the network; and
- dynamic information associated with the UE's current conditions,
- wherein the one or more configurations sent to the UE are based on the received information.

C1. A user equipment (UE) configured to operate in a cell of a wireless network, the UE comprising:
- radio transceiver circuitry configured to communicate with a network node of the wireless network; and
- processing circuitry operatively coupled to the radio transceiver circuitry, whereby the processing circuitry and the radio transceiver circuitry are configured to perform operations corresponding to any of the methods of embodiments A1-A20.

C2. A user equipment (UE) configured to operate in a cell of a wireless network, the UE being further configured to perform operations corresponding to any of the methods of embodiments A1-A20.

C3. A non-transitory, computer-readable medium storing computer-executable instructions that, when executed by processing circuitry of a user equipment (UE) configured to operate in a cell of a wireless network, configure the UE to perform operations corresponding to any of the methods of embodiments A1-A20.

C4. A computer program product comprising computer-executable instructions that, when executed by processing circuitry of a user equipment (UE) configured to operate in a cell of a wireless network, configure the UE to perform operations corresponding to any of the methods of embodiments A1-A20.

D1. A network node configured to serve a cell in a wireless network, the network node comprising:
- radio network interface circuitry configured to communicate with user equipment (UEs); and
- processing circuitry operatively coupled to the radio network interface circuitry, whereby the processing circuitry and the radio network interface circuitry are configured to perform operations corresponding to any of the methods of embodiments B1-B26.

D2. A network node configured to serve a cell in a wireless network, the network node being further configured to perform operations corresponding to any of the methods of embodiments B1-B26.

D3. A non-transitory, computer-readable medium storing computer-executable instructions that, when executed by processing circuitry of a network node configured to serve a cell in a wireless network, configure the network node to perform operations corresponding to any of the methods of embodiments B1-B26.

D4. A computer program product comprising computer-executable instructions that, when executed by processing circuitry of a network node configured to serve a cell in a wireless network, configure the network node to perform operations corresponding to any of the methods of embodiments B1-B26.

The invention claimed is:

1. A method for a user equipment (UE) configured to operate in a cell of the wireless network, the method comprising:
- receiving, from a network node of the wireless network, one or more configurations for UE operation in the cell, wherein each of the configurations include a QoS identifier associated with one or more QoS characteristics;
- determining one or more of the following information associated with at least the received configurations and with UE data traffic: UE energy efficiency (EE), and quality-of-service (QoS); and
- sending, to the network node, the determined information or one or more indications thereof,
- wherein the UE determines and sends UE EE information only for the configurations having a QoS identifier and/or QoS characteristics that correspond to at least one of the following: an established data radio bearer (DRB) for the UE; and data traffic of one or more UE applications.

2. The method of claim 1, wherein determining the UE EE information associated with each of the received configurations comprises determining one of the following for one of the configurations being used by the UE for operating in the cell:
- an actual UE energy consumption based on operating current measurements during an observation period; or
- an estimated UE energy consumption based on:
  - durations spent by the UE in each of a plurality of operating states during the observation period, and
  - a model for UE energy consumption in each of the plurality of operating states.

3. The method of claim 1, wherein determining the UE EE information associated with each of the received configurations comprises determining an estimated UE energy consumption for a configuration not being used by the UE, based on one or more of the following:
- a database storing energy consumption information for at least one of a manufacturer, a model number, and a chipset associated with the UE;
- actual UE energy consumption during previous operation in the configuration; and
- estimated durations spent by the UE in each of a plurality of operating states and a model for UE energy consumption in each of the plurality of operating states.

4. The method of claim 1, wherein the determined information or one or more indications thereof sent to the network node includes one or more of the following:
- respective absolute EE ratings for the received configurations;
- one absolute EE rating for a received configuration that is being used by the UE;
- respective EE ratings of the received configurations relative to a reference EE rating;
- respective EE differences between the received configurations and a configuration being used by the UE;
- an EE difference between two of the received configurations;
- actual or estimated absolute UE energy consumption for the received configurations; and
- actual or estimated UE energy consumption for the received configurations, relative to a reference UE energy consumption.

5. The method of claim 4, wherein:
- each received configuration includes a corresponding reference EE rating;

each reference EE rating includes an estimated range of absolute EE ratings for the corresponding configuration; and the indications sent to the network node comprise indications of whether actual EE ratings of the receive configurations are within the respective estimated ranges of absolute EE ratings.

6. The method of claim 4, wherein the determined information or one or more indications thereof sent to the network node also includes one or more of the following:

respective absolute QoS ratings for the received configurations;

one absolute QoS rating for a received configuration that is being used by the UE;

respective QoS differences between the received configurations and a configuration being used by the UE; and a QoS difference between two of the received configurations.

7. The method of claim 1, wherein the determined information associated with at least the received configurations also includes a UE-preferred configuration not included in the received configurations, with an indication of the UE-preferred configuration being sent to the network node together with one or more of the following:

UE EE and/or QoS information associated with the UE-preferred configuration; and an indication of one or more criteria for selecting the UE-preferred configuration.

8. The method of claim 1, wherein the determined information or one or more indications thereof are sent to the network node responsive to one or more of the following events or conditions:

receiving the configurations;

a change in the UE data traffic;

UE activation or deactivation of applications;

UE change between connected and non-connected states with the wireless network;

a UE mobility operation;

change in one or more of the following used by the UE: network slice; QoS flow; data radio bearer, DRB; signaling radio bearer, SRB; and quality of experience, QoE, measurement configuration;

actual or estimated UE energy consumption for a configuration used by the UE is greater than a first threshold;

QoS for a configuration used by the UE is less than a second threshold; and a network-configured periodic or semi-statistical schedule.

9. A user equipment (UE) configured to operate in a cell of a wireless network, the UE comprising communication interface circuitry and processing circuitry that are operatively coupled and are configured to perform the method of claim 1.

10. The UE of claim 9, wherein the processing circuitry and the communication interface circuitry are configured to determine the UE EE information associated with each of the received configurations based on determining one of the following for one of the configurations being used by the UE for operating in the cell:

an actual UE energy consumption based on operating current measurements during an observation period; or an estimated UE energy consumption based on:

durations spent by the UE in each of a plurality of operating states during the observation period, and a model for UE energy consumption in each of the plurality of operating states.

11. The UE of claim 9, wherein the processing circuitry and the communication interface circuitry are configured to determine the UE EE information associated with each of the received configurations based on determining an estimated UE energy consumption for a configuration not being used by the UE, based on one or more of the following:

a database storing energy consumption information for at least one of a manufacturer, a model number, and a chipset associated with the UE;

actual UE energy consumption during previous operation in the configuration; and estimated durations spent by the UE in each of a plurality of operating states and a model for UE energy consumption in each of the plurality of operating states.

12. The UE of claim 9, wherein the determined information or one or more indications thereof sent to the network node includes one or more of the following:

respective absolute EE ratings for the received configurations;

one absolute EE rating for a received configuration that is being used by the UE;

respective EE ratings of the received configurations relative to a reference EE rating;

respective EE differences between the received configurations and a configuration being used by the UE;

an EE difference between two of the received configurations;

actual or estimated absolute UE energy consumption for the received configurations; and actual or estimated UE energy consumption for the received configurations, relative to a reference UE energy consumption.

13. The UE of claim 12, wherein:

each received configuration includes a corresponding reference EE rating;

each reference EE rating includes an estimated range of absolute EE ratings for the corresponding configuration; and the indications sent to the network node comprise indications of whether actual EE ratings of the receive configurations are within the respective estimated ranges of absolute EE ratings.

14. The UE of claim 12, wherein the determined information or one or more indications thereof sent to the network node also includes one or more of the following:

respective absolute QoS ratings for the received configurations;

one absolute QoS rating for a received configuration that is being used by the UE;

respective QoS differences between the received configurations and a configuration being used by the UE; and a QoS difference between two of the received configurations.

15. The UE of claim 9, wherein the determined information associated with at least the received configurations also includes a UE-preferred configuration not included in the received configurations, with an indication of the UE-preferred configuration being sent to the network node together with one or more of the following:

UE EE and/or QoS information associated with the UE-preferred configuration; and an indication of one or more criteria for selecting the UE-preferred configuration.

16. The UE of claim 9, wherein the determined information or one or more indications thereof are sent to the network node responsive to one or more of the following events or conditions:

reception of the configurations;

a change in the UE data traffic;

UE activation or deactivation of applications;

UE change between connected and non-connected states with the wireless network;

a UE mobility operation;

change in one or more of the following used by the UE: network slice; QoS flow; data radio bearer, DRB; signaling radio bearer, SRB; and quality of experience, QoE, measurement configuration;

actual or estimated UE energy consumption for a configuration used by the UE is greater than a first threshold;

QoS for a configuration used by the UE is less than a second threshold; and a network-configured periodic or semi-statistical schedule.

* * * * *